(12) United States Patent
Kwon et al.

(10) Patent No.: US 9,763,259 B2
(45) Date of Patent: Sep. 12, 2017

(54) SOUNDING METHOD

(71) Applicant: NEWRACOM, INC., Irvine, CA (US)

(72) Inventors: Yongjin Kwon, Daejeon (KR); Hyungu Park, Daejeon (KR); Jongee Oh, Irvine, CA (US); Inkyeong Choi, Daejeon (KR)

(73) Assignee: NEWRACOM, INC., Irvine, CA (US)

( * ) Notice: Subject to any disclaimer, the term of this patent is extended or adjusted under 35 U.S.C. 154(b) by 65 days.

(21) Appl. No.: 14/862,078

(22) Filed: Sep. 22, 2015

(65) Prior Publication Data
US 2016/0088641 A1    Mar. 24, 2016

Related U.S. Application Data

(60) Provisional application No. 62/054,270, filed on Sep. 23, 2014.

(30) Foreign Application Priority Data

Aug. 19, 2015 (KR) .......................... 10-2015-0116576

(51) Int. Cl.
*H04B 7/02* (2017.01)
*H04W 72/08* (2009.01)
(Continued)

(52) U.S. Cl.
CPC ............ *H04W 72/085* (2013.01); *H04L 1/00* (2013.01); *H04L 5/006* (2013.01); *H04L 5/0044* (2013.01);
(Continued)

(58) Field of Classification Search
None
See application file for complete search history.

(56) References Cited

U.S. PATENT DOCUMENTS

2013/0107916 A1\* 5/2013 Liu ...................... H04B 7/0452
375/219
2014/0334420 A1\* 11/2014 You ..................... H04L 25/0204
370/329

(Continued)

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.

(Continued)

*Primary Examiner* — Chi H Pham
*Assistant Examiner* — Shick Hom
(74) *Attorney, Agent, or Firm* — McDermott, Will & Emery LLP

(57) ABSTRACT

A sounding method by a receiving device is provided. The receiving device receives an NDPA frame from a transmitting device, and then receives an NDP frame from the transmitting device. After receiving the NDP frame, the receiving device transmits to the transmitting device a feedback frame including subchannel information measured on a subchannel that is allocated to the first receiving device among a plurality of subchannels into which a predetermined band is divided.

18 Claims, 24 Drawing Sheets

(51) Int. Cl.
*H04W 16/28* (2009.01)
*H04L 1/00* (2006.01)
*H04W 24/00* (2009.01)
*H04L 5/00* (2006.01)
*H04W 72/04* (2009.01)
*H04W 84/12* (2009.01)

(52) U.S. Cl.
CPC ........... *H04W 16/28* (2013.01); *H04W 24/00* (2013.01); *H04W 72/046* (2013.01); *H04W 84/12* (2013.01)

(56) References Cited

U.S. PATENT DOCUMENTS

2014/0348097 A1* 11/2014 Park .................... H04L 25/0226
370/329

2016/0043783 A1* 2/2016 Xia ...................... H04B 7/0417
370/329

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

* cited by examiner

FIG. 25

| L-STF | L-LTF | L-SIG | HE-SIG-A | HE-STF | HE-LTF1 | HE-LTF2 | HE-SIG-B |

$$\begin{bmatrix} 1 & -1 \\ 1 & 1 \end{bmatrix}$$

FIG. 26

| L-STF | L-LTF | L-SIG | HE-SIG-A | HE-STF | HE-LTF1 | HE-LTF2 | HE-LTF3 | HE-SIG-B |

$$\begin{bmatrix} 1 & -1 & 1 \\ 1 & -w^1 & w^2 \\ 1 & -w^2 & w^4 \end{bmatrix}, w=\exp(-\frac{j2\pi}{3})$$

FIG. 27

| L-STF | L-LTF | L-SIG | HE-SIG-A | HE-STF | HE-LTF1 | HE-LTF2 | HE-LTF3 | HE-LTF4 | HE-SIG-B |

$$\begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

SOUNDING METHOD

CROSS-REFERENCE TO RELATED APPLICATION

This application claims priority to and the benefit of U.S. Provisional Application No. 62/054,270, filed on Sep. 23, 2014, in the U.S. Patent and Trademark Office and priority to and the benefit of Korean Patent Application No. 10-2015-0116576, filed on Aug. 19, 2015, in the Korean Intellectual Property Office, the entire contents of which are incorporated herein by reference.

BACKGROUND (a) Field

The described technology relates generally to a sounding method. More particularly, the described technology relates generally to a sounding method in a wireless local area network (WLAN).

(b) Description of the Related Art

A WLAN transmits or receives data using an unlicensed band of 2.4 GHz or 5 GHz and is being standardized by the IEEE (Institute of Electrical and Electronics Engineers) Part 11 under the name of "Wireless LAN Medium Access Control (MAC) and Physical Layer (PHY) Specifications."

After an original standard was published in 1999, new version standards are continuously published by amendments. The IEEE standard 802.11a (IEEE Std 802.11a-1999) supporting 2.4 GHz band was published in 1999, the IEEE standard 802.11b (IEEE Std 802.11b-1999) supporting 5 GHz band was published in 1999, and the IEEE standard 802.11g (IEEE Std 802.11g-2003) supporting 5 GHz band was published in 2003. These standards are called legacy. Subsequently, the IEEE standard 802.11n (IEEE Std 802.11n-2009) for enhancements for higher throughput (HT) was published in 2009, and the IEEE standard 802.11 ac (IEEE 802.11 ac-2013) for enhancements for very high throughput (VHT) was published in 2013. Recently, a high efficiency (HE) WLAN for enhancing the system throughput in high density scenarios is being developed by the IEEE 802.11ax task group.

The HE WLAN or a subsequent WLAN may use a multi-user transmission. For example, a device may simultaneously transmit data to a plurality of devices or the plurality of devices may simultaneously transmit data by using a scheme such as orthogonal frequency division multiple access (OFDMA).

For the multi-user transmission, a given bandwidth may be divided into a plurality of subchannels and the plurality of subchannels may be allocated to multi users. In this case, a scheme such as beamforming may be applied to the plurality of subchannels to improve the transmission gain. For this, a sounding procedure is required for the plurality of subchannels.

SUMMARY

An embodiment of the present disclosure provides a sounding method for multi users.

According to an embodiment, a sounding method by a first receiving device is provided. The method includes receiving a null data packet announcement (NDPA) frame from a transmitting device, receiving a null data packet (NDP) frame from the transmitting device after receiving the NPDA frame, and transmitting to the transmitting device a feedback frame including subchannel information measured on a first subchannel after receiving the NDP frame. The first subchannel is a subchannel that is allocated to the first receiving device among a plurality of subchannels into which a predetermined band is divided.

The subchannel information may include an average signal-to-noise ratio (SNR) of the first subchannel.

The subchannel information may include average SNRs of the first subchannel for a plurality of space-time streams.

The feedback frame may further include subchannel information measured on other subchannels excluding the first subchannel.

Transmitting the feedback frame may include transmitting the feedback frame to the transmitting device before a second feedback frame including subchannel information measured on a second subchannel is transmitted to the transmitting device by a second receiving device or after the second feedback frame is transmitted to the transmitting device by the second receiving device, the second subchannel being a subchannel that is allocated to the second receiving device among the plurality of subchannels.

Transmitting the feedback frame may include transmitting the feedback frame to the transmitting device while a second feedback frame including subchannel information measured on the second subchannel is transmitted to the transmitting device by a second receiving device, the second subchannel being a subchannel that is allocated to the second receiving device among the plurality of subchannels.

Transmitting the feedback frame may include adding pad bits to a data field of the feedback frame when a length of data to be transmitted by the feedback frame is shorter than a predetermined length, or partitioning the data into a plurality of fragments and inserting any one of the fragments to the data field of the feedback frame when the length of the data is longer than the predetermined length.

The NDPA frame or the NDP frame may indicate information corresponding to the predetermined length.

The NDPA frame or the NDP frame may include allocation information of the first subchannel.

The subchannel information may be measured on each of a predetermined number of subchannels including the first subchannel, and the first subchannel may be allocated based on the subchannel information.

The NDPA frame may include information on the predetermined number.

The method may further include receiving a frame including selected subchannel information from the transmitting device, the selected subchannel information indicating a subchannel that is selected by other receiving device among the plurality of subchannels. The predetermined number of subchannels may not include the subchannel that that is selected by the other receiving device.

The selected subchannel information may be represented by a bitmap having a plurality of bits that correspond to the plurality of subchannels respectively, and a predetermined value in each of the plurality of bits may indicate that a corresponding subchannel is selected by the other device.

Transmitting the feedback frame may include transmitting a subchannel information frame to the transmitting device after receiving the NDP frame, the subchannel information frame including measurement information that is measured on each of the plurality of subchannels by the first receiving device. Transmitting the feedback frame may further include receiving from the transmitting device a channel feedback trigger frame including allocation information of the plurality of subchannels and transmitting the feedback frame to the transmitting device after receiving the channel feedback trigger frame.

Transmitting the subchannel information frame may include transmitting the subchannel information frame to the transmitting device before a second subchannel information frame is transmitted to the transmitting device by a second receiving device or after the second subchannel information frame is transmitted to the transmitting device by the second receiving device, the second subchannel information frame including measurement information that is measured on each of plurality of subchannels by the second receiving device.

Transmitting the subchannel information frame may include transmitting the subchannel information frame to the transmitting device while a second subchannel information frame is transmitted to the transmitting device by a second receiving device, the second subchannel information frame including measurement information that is measured on each of plurality of subchannels by the second receiving device.

The method may further include receiving a trigger frame from a transmitting device and transmitting a frame including a plurality of long training fields to the transmitting device after receiving the trigger frame. The plurality of long training fields may be multiplied by a predetermined identification code allocated to the first receiving device among a plurality of receiving devices.

A number of the plurality of long training fields may be equal to a number of the plurality of receiving devices.

The trigger frame may include information on a predetermined identification code allocated to each of the plurality of receiving devices.

According to another embodiment, a sounding method by a transmitting device is provided. The method includes transmitting an NDPA frame to a plurality of receiving devices, transmitting an NDP frame to the plurality of receiving devices after transmitting the NPDA frame, and receiving from each receiving device a feedback frame including subchannel information measured on a subchannel that is allocated to each receiving device among a plurality of subchannels into which a band is divided, after transmitting the NDP frame.

According to yet another embodiment, a sounding apparatus of a receiving device is provided. The sounding apparatus includes a processor and a transceiver. The transceiver receives an NDPA frame from a transmitting device and receives an NDP frame from the transmitting device after receiving the NPDA frame. The processor generates a feedback frame including subchannel information measured on a first subchannel after receiving the NDP frame. The first subchannel is a subchannel that is allocated to the first receiving device among a plurality of subchannels into which a predetermined band is divided. The transceiver transmits the feedback frame to the transmitting device.

According to still another embodiment, a sounding apparatus of a transmitting device is provided. The sounding apparatus includes a processor and a transceiver. The processor generates an NDPA frame and an NDP frame. The transceiver transmits the NDPA frame to a plurality of receiving devices, transmits the NDP frame to the plurality of receiving devices after transmitting the NPDA frame, and receives from each receiving device a feedback frame including subchannel information measured on a subchannel that is allocated to each receiving device among a plurality of subchannels into which a band is divided, after transmitting the NDP frame.

BRIEF DESCRIPTION OF THE DRAWINGS

FIG. 25, FIG. 26, and FIG. 27 each shows an LTF frame in a wireless communication network according to various embodiments.

DETAILED DESCRIPTION OF EMBODIMENTS

Figure 1:
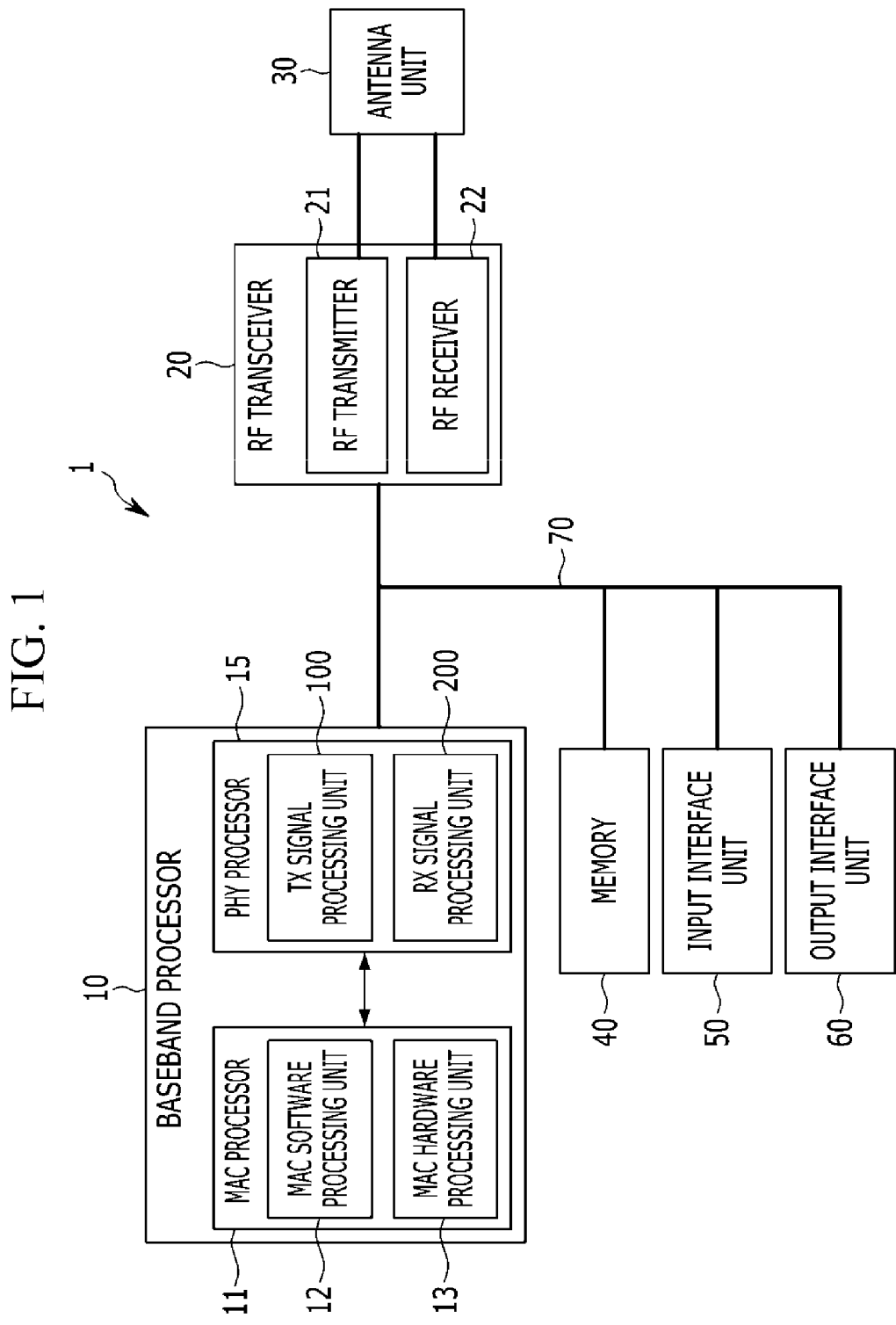
FIG. 1 is a schematic block diagram of a WLAN device according to an embodiment.

In the following detailed description, only certain embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to the IEEE (Institute of Electrical and Electronics Engineers) standard 802.11. The plurality of WLAN devices may include a WLAN device that is an access point and the other WLAN devices that are non-AP stations (non-AP STAs). Alternatively, all of the plurality of WLAN devices may be non-AP STAs in ad-hoc networking. In general, the AP STA and the non-AP STA may be collectively called the STAs. However, for ease of description, herein, only the non-AP STA are referred to as the STAs.

FIG. 1 is a schematic block diagram exemplifying a WLAN device according to an embodiment.

Referring to FIG. 1, the WLAN device 1 includes a baseband processor 10, a radio frequency (RF) transceiver 20, an antenna unit 30, a memory 40 including non-transitory computer-readable media, an input interface unit 50, an output interface unit 60, and a bus 70.

The baseband processor 10 performs baseband signal processing, and includes a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer, and the MAC hardware processing unit 13 may implement remaining functions of the MAC layer as hardware (hereinafter referred to "MAC hardware"). However, the MAC processor 11 is not limited to this.

The PHY processor 15 includes a transmitting (Tx) signal processing unit 100 and a receiving (Rx) signal processing unit 200.

The baseband processor 10, the memory 40, the input interface unit 50, and the output interface unit 60 may communicate with each other via the bus 70.

The RF transceiver 20 includes an RF transmitter 21 and an RF receiver 22.

The memory 40 may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
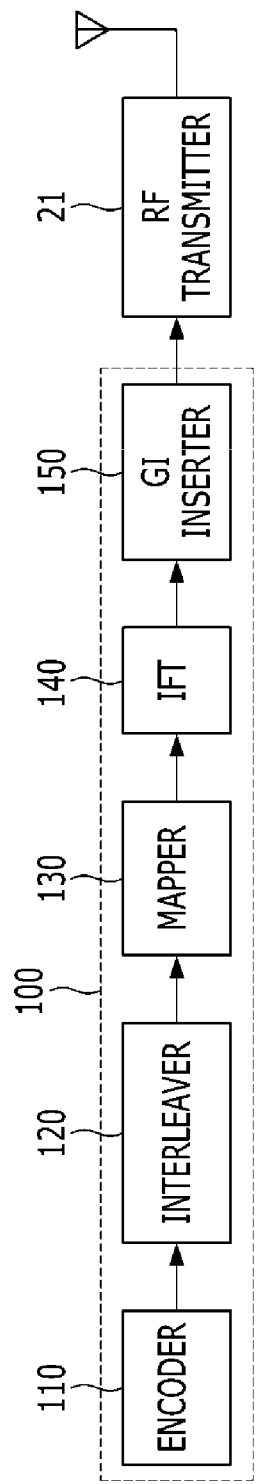
FIG. 2 is a schematic block diagram of a transmitting signal processor in an embodiment suitable for use in a WLAN.

FIG. 2 is a schematic block diagram of a transmitting signal processor 100 in an embodiment suitable for use in a WLAN.

Referring to FIG. 2, a transmitting signal processing unit 100 includes an encoder 110, an interleaver 120, a mapper 130, an inverse Fourier transformer (IFT) 140, and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change an order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers 130 corresponding to a number of spatial streams $N_{SS}$. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper.

When the MU-MIMO is used, some blocks before the spatial mapper may be provided for each user.

The GI inserter 150 prepends a guard interval (GI) to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
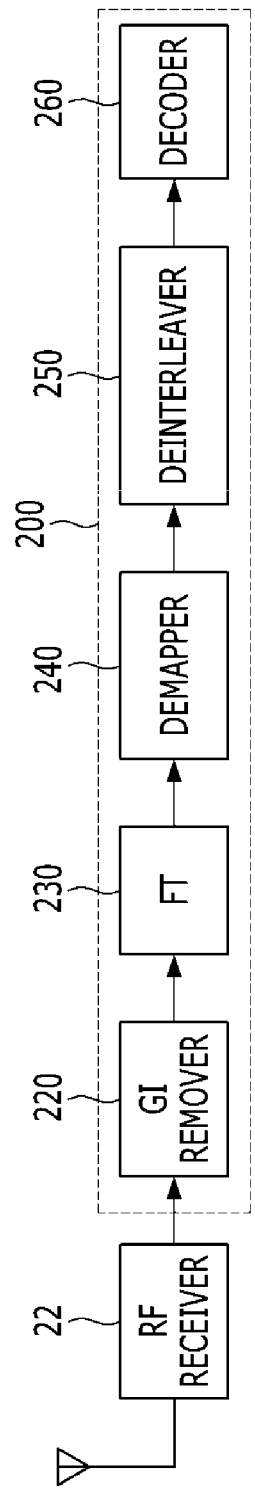
FIG. 3 is a schematic block diagram of a receiving signal processing unit in an embodiment suitable for use in the WLAN.

FIG. 3 is a schematic block diagram of a receiving signal processing unit according to an embodiment suitable for use in the WLAN.

Referring to FIG. 3, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into a symbol. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain.

When the MIMO or the MU-MIMO is used, the receiving signal processing unit 200 may include a spatial demapper for converting the Fourier transformed received symbols to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder, the receiving signal processing unit 100 may not use the encoder deparser.

Figure 4:
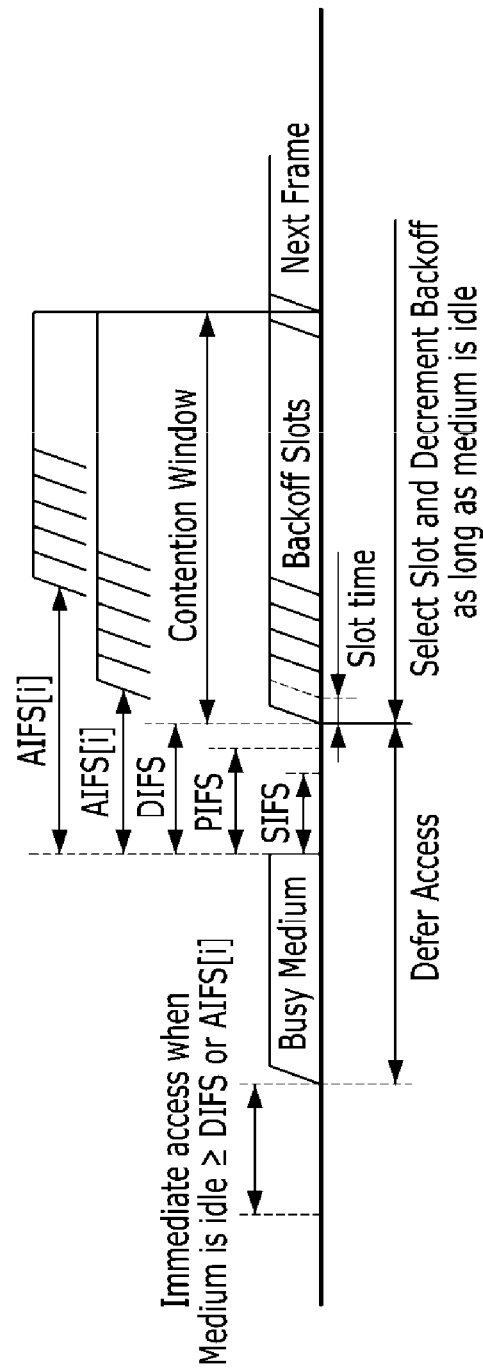
FIG. 4 exemplifies illustrates Inter-Frame Space (IFS) relationships.

FIG. 4 illustrates interframe space (IFS) relationships.

A data frame, a control frame, or a management frame may be exchanged between WLAN devices.

The data frame is used for transmission of data forwarded to a higher layer. The WLAN device transmits the data frame after performing backoff if a distributed coordination function IFS (DIFS) has elapsed from a time when the medium has been idle. The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. When the control frame is not a response frame of a previous frame, the WLAN device transmits the control frame after performing backoff when the DIFS has elapsed. When the control frame is the response frame of a previous frame, the WLAN device transmits the control frame without performing backoff when a short IFS (SIFS) has elapsed. The type and subtype of a frame may be identified by a type field and a subtype field in a frame control field.

On the other hand, a Quality of Service (QoS) STA may transmit the frame after performing backoff when an arbitration IFS (AIFS) for access category (AC), i.e., AIFS[AC], has elapsed. In this case, the data frame, the management frame, or the control frame which is not the response frame may use the AIFS[AC].

Figure 5:
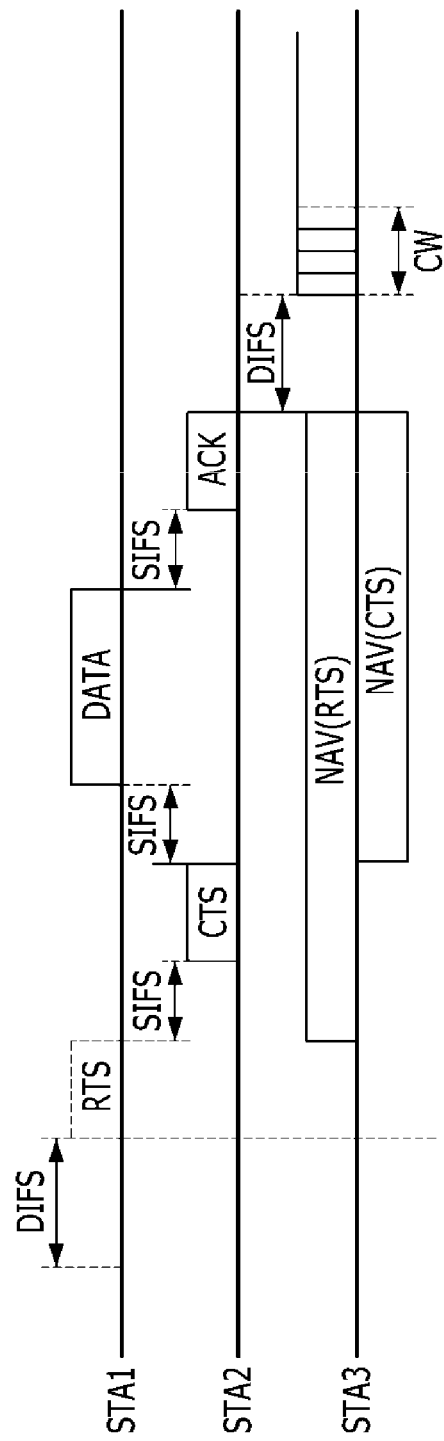
FIG. 5 is a schematic diagram illustrating a CSMA/CA based frame transmission procedure for avoiding collision between frames in a channel.

FIG. 5 is a schematic diagram illustrating a CSMA (carrier sense multiple access)/CA (collision avoidance) based frame transmission procedure for avoiding collision between frames in a channel.

Referring to FIG. 5, STA1 is a transmit WLAN device for transmitting data, STA2 is a receive WLAN device for receiving the data, and STA3 is a third WLAN device which may be located at an area where a frame transmitted from the STA1 and/or a frame transmitted from the STA2 can be received by the third WLAN device.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When it is determined that the channel is not in use by other devices during DIFS (that is, that the channel is idle), the STA1 may transmit an RTS frame to the STA2 after performing backoff. Upon receiving the RTS frame, the STA2 may transmit a CTS frame as a response of the CTS frame after a SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. For example, the NAV timer may be set for a duration of SIFS+CTS frame duration+SIFS+data frame duration+SIFS+ACK frame duration. When the STA3 receives the CTS frame, it may set the NAV timer for a transmission duration of subsequently transmitted frames (for example, a duration of SIFS+data frame duration+SIFS+ACK frame duration) by using duration information included in the RTS CTS frame. For example, the NAV timer may be set for a duration of SIFS+data frame duration+SIFS+ACK frame duration. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after a SIFS elapses.

When the NAV timer expires, the STA3 may determine whether the channel is busy by the carrier sensing. Upon determining that the channel is not in use by the other devices during DIFS after the NAV timer has expired, the STA3 may attempt the channel access after a contention window according to random backoff elapses.

Now, a sounding method in a wireless communication network according to an embodiment is described with reference to the drawings.

Figure 6:
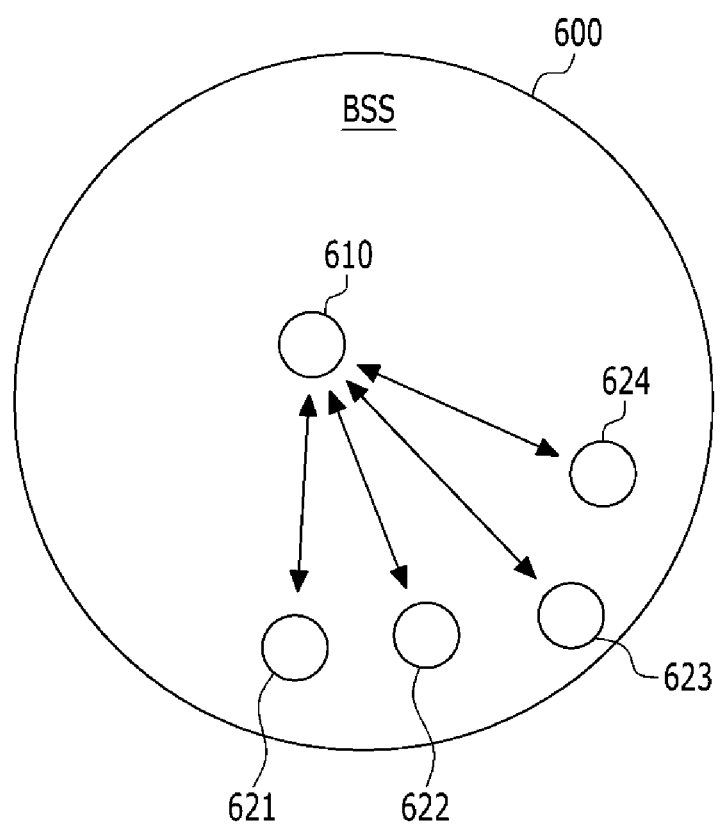
FIG. 6 shows an example of a wireless communication network according to an embodiment.

FIG. 6 shows an example of a wireless communication network according to an embodiment.

Referring to FIG. 6, a basic service set (BSS) 600 includes a plurality of WLAN devices. The plurality of WLAN devices include a beamformer device 610 and beamformee devices 621, 622, 623, and 624. The beamformer device 610 may be a device for transmitting a PHY protocol data unit (PPDU) by using a beamforming steering matrix. The beamformee devices 621, 622, 623, and 624 may be devices for receiving the PPDU that is transmitted by using the beamforming steering matrix. The four beamformee devices 621, 622, 623, and 624 are exemplified in FIG. 6 for convenience, but the number of beamformee devices is not limited thereto.

In some embodiments, the beamformer device may be an AP and the beamformee devices may be stations.

The beamformer device 610 and the beamformee devices 621, 622, 623, and 624 support a wireless communication network according to an embodiment. For example, the wireless communication network according to an embodiment may be a high efficiency (HE) WLAN developed by the IEEE 802.11 ax task group. Hereinafter, it is assumed for convenience that the wireless communication network according to an embodiment is the HE WLAN.

In the wireless communication network according to an embodiment, a predetermined band is divided into a plurality of subbands (i.e., subchannels) and the plurality of subchannels are allocated to the plurality of beamformer devices. In one embodiment, one subchannel may be allocated to one beamformer device. In another embodiment, two or more subchannels may be allocated to one beamformer device, or one subchannel may be allocated to two or more beamformer devices. In some embodiments, an OFDMA scheme may be used for transmissions on the plurality of subchannels.

The BSS 600 may further include a previous version device. The previous version device may be, for example, a device (hereinafter referred to as a "legacy device") supporting the IEEE standard 802.11a, 802.11b or 802.11g (IEEE Std 802.11a-1999, IEEE Std 802.11b-1999 or IEEE Std 802.11g-2003), a device (hereinafter referred to as an "HT device") supporting the IEEE standard 802.11n (IEEE Std 802.11n-2009) for enhancements for higher throughput (HT), or a device (hereinafter referred to as a "VHT device") supporting the IEEE standard 802.11ac (IEEE Std 802.11 ac-2013) for enhancements for very high throughput (VHT).

Figure 7:
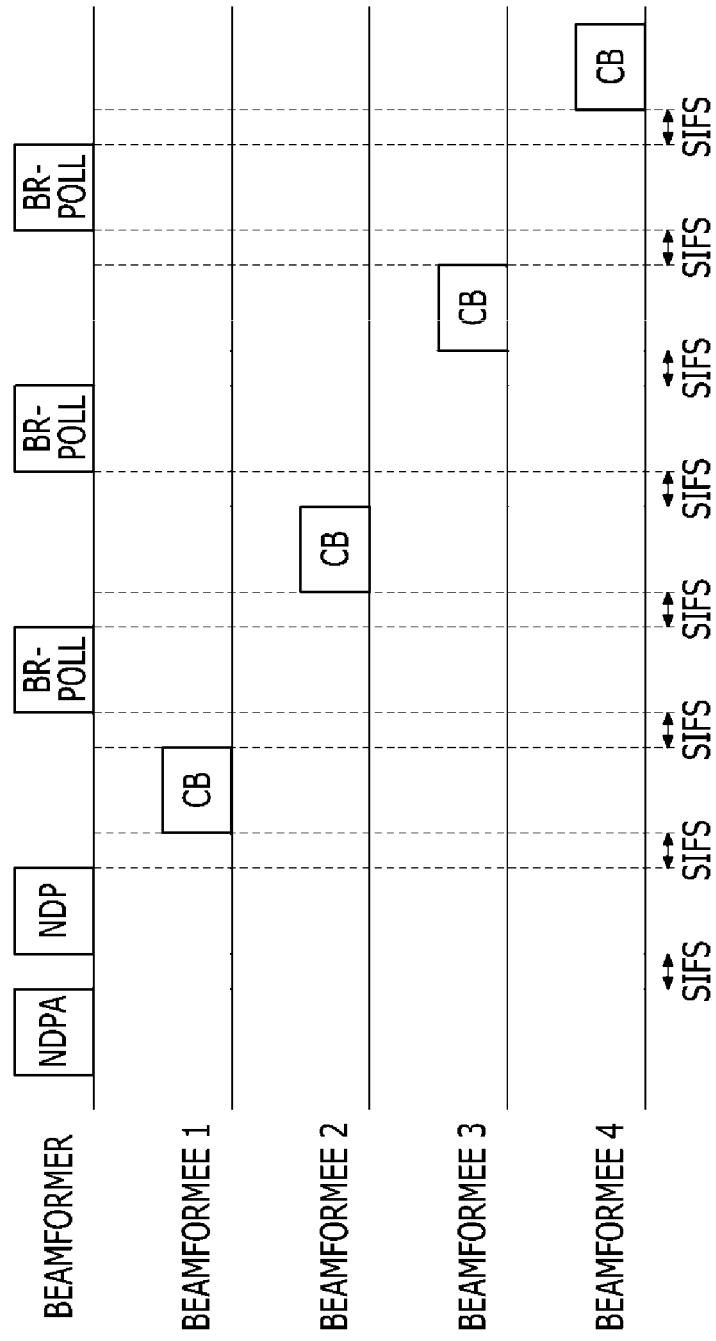
FIG. 7 shows a sounding procedure in a wireless communication network according to an embodiment.

FIG. 7 shows a sounding procedure in a wireless communication network according to an embodiment.

Referring to FIG. 7, a beamformer device transmits a null data packet announcement (NDPA) frame to beamformee devices, and then transmits a null data packet (NDP) frame to the beamformee devices after a SIFS interval. The first beamformee device (e.g., beamformee device 1) among the plurality of beamformee devices receiving the NDP frame feeds a feedback frame back to the beamformer device as a response of the NDP frame after a SIFS interval. For example, the feedback frame may be a compressed beamforming (CB) frame. The beamformer device receiving the CB frame from the beamformee device 1 transmits a beamforming report poll (BR-poll) frame to the second beamformee device (e.g., beamformee device 2) after the SIFS interval. The beamformee device 2 receiving the BR-poll frame feeds a CB frame back to the beamformer device as a response of the BR-poll frame after the SIFS interval. The beamformer device receiving the CB frame from the beamformee device 2 transmits a BR-poll frame to the third beamformee device (e.g., beamformee device 3) after the SIFS interval. The beamformee device 3 receiving the BR-poll frame feeds a CB frame back to the beamformer device as a response of the BR-poll frame after the SIFS interval. The beamformer device receiving the CB frame from the beamformee device 3 transmits a BR-poll frame to the fourth beamformee device (e.g., beamformee device 4) after the SIFS interval. The beamformee device 4 receiving the BR-poll frame feeds a CB frame back to the beamformer device as a response of the BR-poll frame after the SIFS interval.

In some embodiments, the CB frame transmitted by each beamformer device includes beamforming report information as feedback information. In one embodiment, the beamforming report information may be compressed beamforming report information.

FIG. 8, FIG. 9, FIG. 10 and FIG. 11 show CB frames according to various embodiments.

Figure 8:
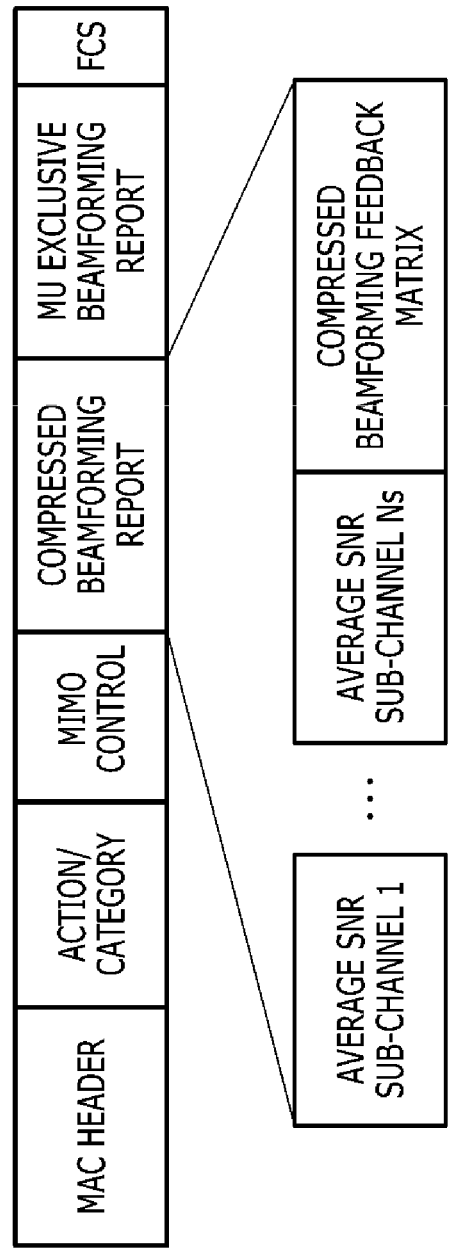
FIG. 8, FIG. 9, FIG. 10 and FIG. 11 show CB frames according to various embodiments.

Referring to FIG. 8, in an embodiment, compressed beamforming report information of each CB frame includes subchannel information that is measured on each of a plurality of subchannels. The beamformee device may measure the subchannel information based on an NDP frame. In one embodiment, the subchannel information for a subchannel may include an average signal-to-noise ratio (SNR). When the number of subchannels is Ns, the compressed beamforming report information includes an average SNR of subchannel 1, an average SNR of subchannel 2, . . . , an average SNR of subchannel Ns.

The average SNR of subchannel i may be obtained by calculating SNRs per subcarrier for a plurality of subcarriers of subchannel i and calculating an arithmetic mean of the SNRs per subcarrier. In some embodiments, when a plurality of space-time streams are used, the average SNR of subchannel i may be calculated by averaging arithmetic means of the SNRs per subcarrier for the plurality of space-time streams.

Figure 9:
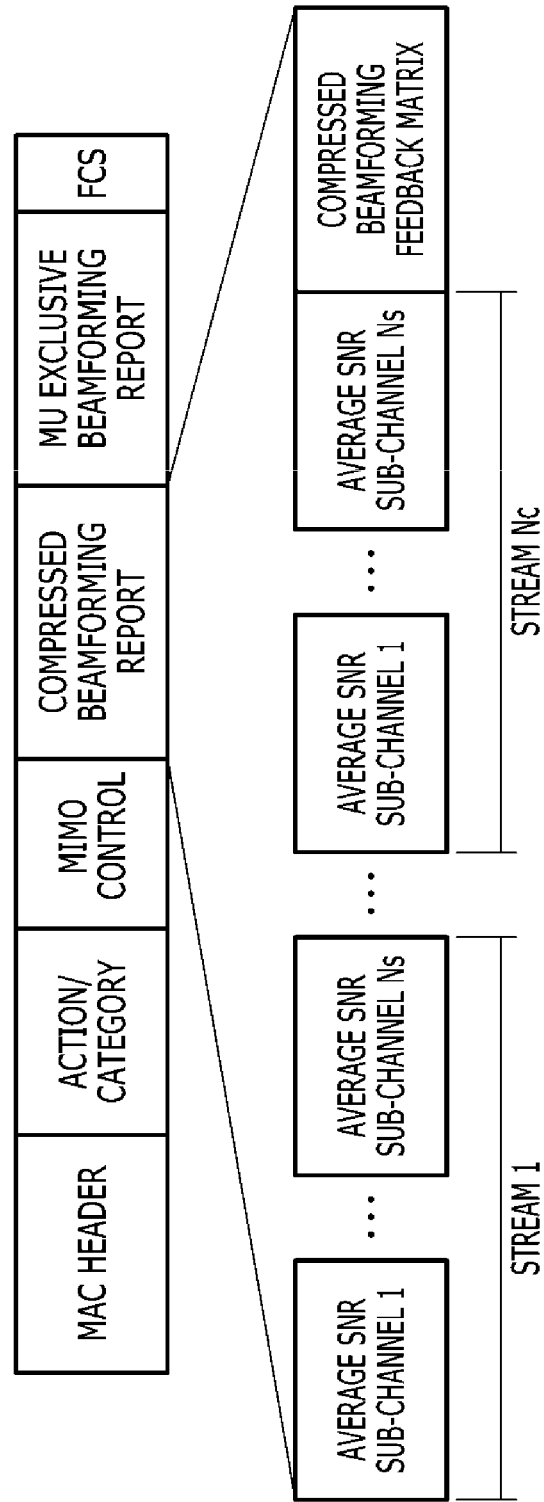

Referring to FIG. 9, in another embodiment, compressed beamforming report information of each CB frame includes subchannel information that is measured on each of a plurality of space-time streams. The beamformee device may measure the subchannel information based on an NDP frame. In some embodiments, the subchannel information of a space-time stream may include average SNR information of the space-time stream.

In some embodiments, when an STBC encoder spreads input data into Nc space-time streams, the compressed beamforming report information includes average SNR information of space-time stream 1, average SNR information of space-time stream 2, . . . , average SNR information of space-time stream Nc. The average SNR information of each space-time stream includes average SNRs for the plurality of subchannels. That is, the average SNR information of space-time stream j includes the average SNR of subchannel 1, the average SNR of subchannel 2, . . . , the average SNR of subchannel Ns.

The average SNR of subchannel i in space-time stream j may be obtained by calculating SNRs per subcarrier for a plurality of subcarriers of subchannel i in space-time stream j and calculating an arithmetic mean of the SNRs per subcarrier.

Figure 10:
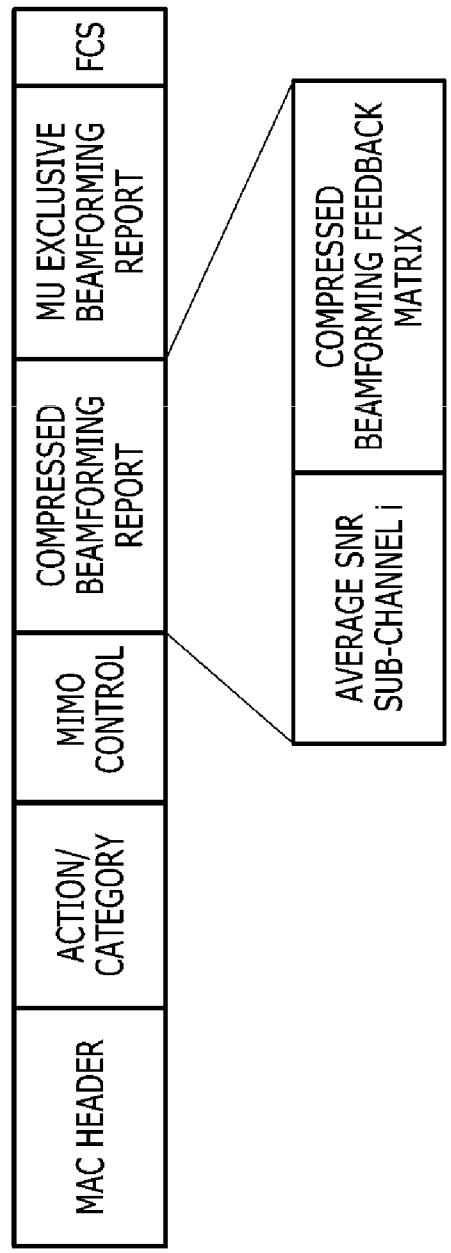
Figure 11:
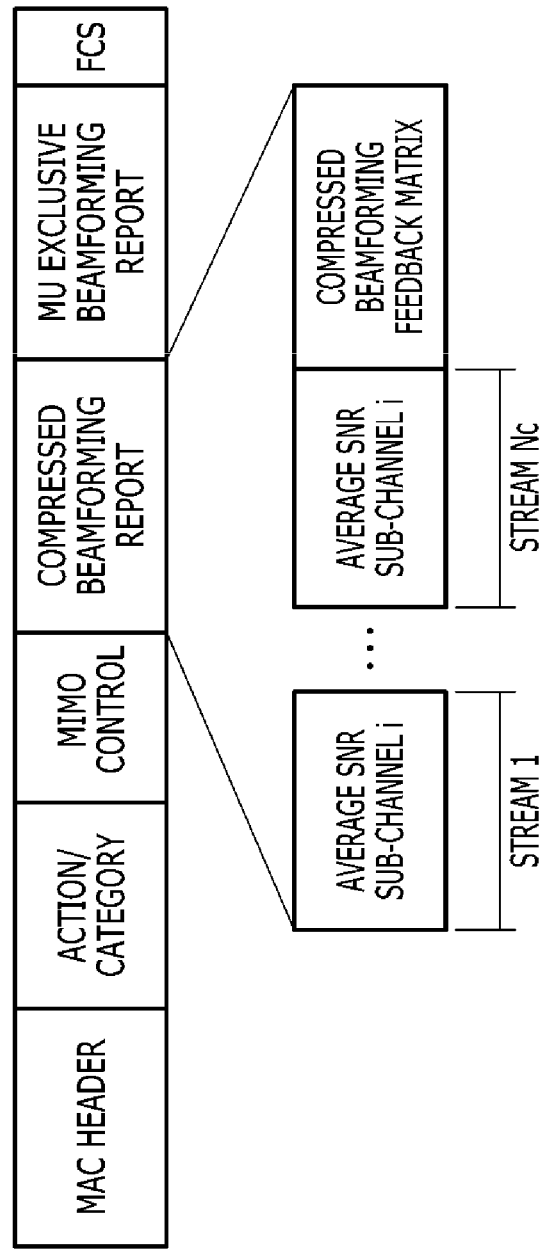

Since each of the plurality of beamformee devices is allocated a corresponding subchannel in an embodiment, each beamformee device may not provide the feedback information for the entire subchannels. As shown in FIG. 10 and FIG. 11, in some embodiments, each beamformer device may provide the feedback information for the allocated subchannel.

Referring to FIG. 10, in yet another embodiment, compressed beamforming report information of a CB frame that is fed back by each beamformee device includes subchannel information of a subchannel allocated to the beamformee device. In some embodiments, the subchannel information may include an average SNR of the subchannel. The compressed beamforming report information of the CB frame that is fed back by beamformee device 1 includes the average SNR of subchannel 1, the compressed beamforming report information of the CB frame that is fed back by beamformee device 2 includes the average SNR of subchannel 2, the compressed beamforming report information of the CB frame that is fed back by beamformee device 3 includes the average SNR of subchannel 3, and the compressed beamforming report information of the CB frame that is fed back by beamformee device 4 includes the average SNR of subchannel 4.

Referring to FIG. 11, in still another embodiment, compressed beamforming report information of a CB frame that is fed back by each beamformee device includes subchannel information of a subchannel allocated to the beamformee device for a plurality of space-time streams. In some embodiments, the subchannel information may include an average SNR of the subchannel in the plurality of space-time streams. The compressed beamforming report information of the CB frame that is fed back by beamformee device 1 includes the average SNRs of subchannel 1 in the plurality of space-time streams, the compressed beamforming report information of the CB frame that is fed back by beamformee device 2 includes the average SNRs of subchannel 2 in the plurality of space-time streams, the compressed beamforming report information of the CB frame that is fed back by beamformee device 3 includes the average SNRs of subchannel 3 in the plurality of space-time streams, and the compressed beamforming report information of the CB frame that is fed back by beamformee device 4 includes the average SNRs of subchannel 4 in the plurality of space-time streams.

According to embodiments shown in FIG. 10 and FIG. 11, because each beamformee device provides the feedback information for the allocated subchannel, the overhead of the CB frame can be reduced.

As described with reference to FIG. 8 to FIG. 11, when the beamformer device receives the average SNR information of each subchannel through the CB frames from the plurality of beamformee devices, the beamformer device may determine a coding and modulation scheme (MCS) of a frame to be transmitted by beamforming based on the average SNR information.

Referring to FIG. 8 to FIG. 11 again, in some embodiments, the compressed beamforming report information may further include beamforming feedback matrix information. The beamforming feedback matrix information may be compressed beamforming feedback matrix information. The compressed beamforming feedback matrix information may be provided in the form of angles representing compressed beamforming feedback matrices for use by the beamformer device to determine steering matrices.

In some embodiments, the CB frame may be a management frame including a MAC header, a frame body field, and a frame check sequence (FCS) field. The frame body field may further include an action/category field, a MIMO control field and an MU (multi-user) exclusive beamforming report field in addition to the compressed beamforming report information.

The action/category field provides a mechanism for specifying extended management actions, and may include a category field and an action details field. The category field is set as any one of predefined values. For example, the category field may be set as a value corresponding to a category of the CB frame described in FIG. 8 to FIG. 11. The action details field includes the details of the actions.

The MIMO control field carries control values necessary for a MIMO transmission when the MIMO transmission is used. For example, the MIMO control field may carry a control value of the compressed beamforming feedback matrix. The MU exclusive beamforming report field may be used to determine the steering matrices.

Hereinafter, a method of notifying beamformee devices of allocated subchannels by a beamformer device is described with reference to FIG. 12 and FIG. 13.

Figure 12:
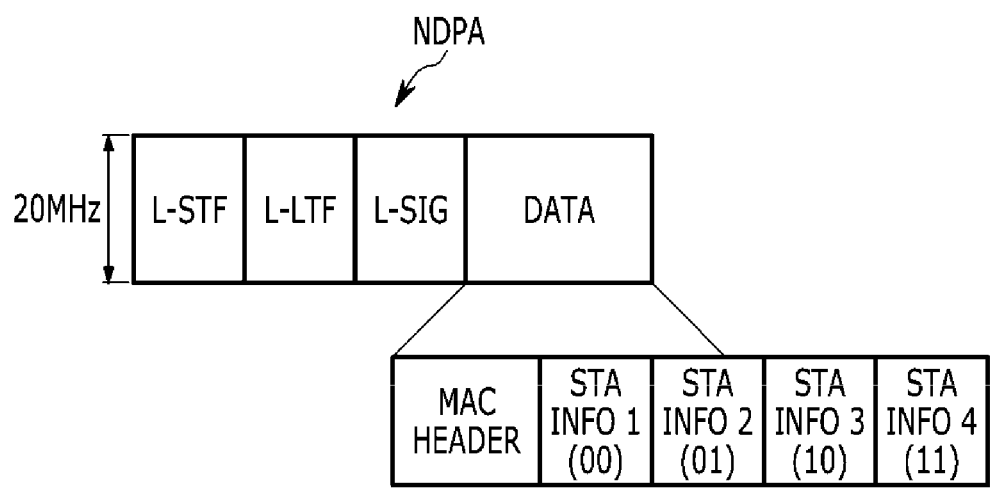
FIG. 12 and FIG. 13 each shows a subchannel allocation notification method in a wireless communication network according to various embodiments.
Figure 13:
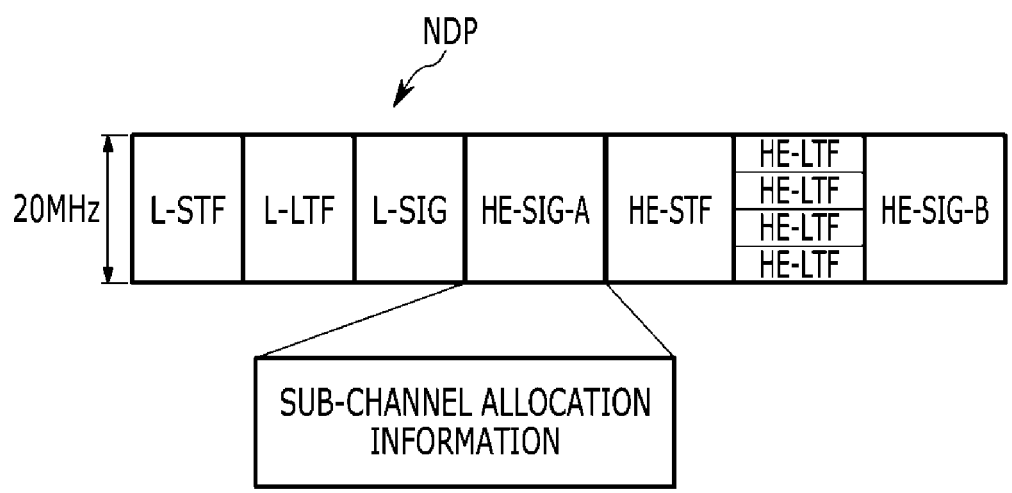

FIG. 12 and FIG. 13 each shows a subchannel allocation notification method in a wireless communication network according to various embodiments.

Referring to FIG. 12, an NDPA frame includes subchannel information of a subchannel allocated to each beamformee device.

In some embodiments, the NDPA frame may have a legacy frame format. The NDPA frame includes a legacy short training field (L-STF), a legacy long training field (L-LTF), a legacy signal field (L-SIG), and a data field. A MAC frame is inserted to the data field, and the MAC frame includes a MAC header and a frame body field. The frame body field includes a station information field (STA Info). When a plurality of beamformee devices (e.g., station), the frame body field includes a plurality of station information field (STA Info 1, . . . , STA Info n) corresponding to the plurality of beamformee devices respectively.

Each station information field (STA Info i) includes information of a corresponding beamformee device and allocation information of a subchannel allocated to the corresponding beamformee device. The information of the beamformee device may include some LSBs (least significant bits) of a association identifier (AID) of the beamformee device. The subchannel allocation information may include information indicating a position of the allocated subchannel. For example, when a band with a 20 MHz bandwidth is divided into four 5 MHz subchannels, the four 5 MHz subchannels (subchannel 1, subchannel 2, subchannel 3, and subchannel 4) may correspond to four values defined two bits, i.e., '00', '01', '10', and '11' respectively. Accordingly, the subchannel allocation information may have any one of the four values '00', '01', '10', and '11' according to the allocated subchannel.

Each of the plurality of beamformee devices receiving the NDPA frame can identify its allocated subchannel.

Referring to FIG. 13, an NDP frame includes allocation information of a subchannel allocated to each beamformee device.

In some embodiments, the NDP frame may have a frame format defined by a wireless communication network (i.e., HE WLAN) according to an embodiment. Such the frame format is referred to as an "HE frame format."

The NDP frame includes a legacy compatible part and an HE compatible part.

The legacy compatible part can be decoded based on a legacy preamble, and the HE compatible part can be decoded based on an HE preamble. The legacy compatible part includes a legacy short training field (L-STF), a legacy long training field (L-LTF), a legacy signal field (L-SIG), and an HE signal field (HE-SIG-A). The L-STF, the L-LTF, and the L-SIG correspond to the legacy preamble. The HE-SIG-A carries signaling information for a device supporting the HE WLAN and may include the subchannel allocation information as the signaling information. The subchannel allocation information includes information on a subchannel allocated to each beamformee device.

The HE compatible part includes the HE preamble and may further include an additional HE signal field (HE-SIG-B). HE preamble may include a HE short training field (HE-STF) and a HE long training field (HE-LTF). The HE-STF may be used for automatic gain control of the HE compatible part, and the HE-LTF may be used for channel estimation of the HE compatible part. In the NDP frame, the HE compatible part does not include a data field.

Each of the beamformee devices receiving the NDP frame can identify its allocated subchannel through the subchannel allocation information carried by the HE signal field.

In some embodiments, the HE-LTF may be transmitted for each subband as shown in FIG. 13 such that the channel estimation can be performed for each subchannel.

In some embodiments, a bandwidth unit of the subchannel may be 2.5 MHz, 5 MHz, 10 MHz, 20 MHz, 40 MHz, or 80 MHz when hardware supporting previous WLANs, for example a VHT WLAN and a WLAN according to the IEEE standard 802.11ah is reused. Accordingly, each subchannel may be allocated a bandwidth as shown in Table 1, in accordance with the number of divided subchannels.

TABLE 1

|  | Number of subchannels | Bit index | Sub-channel allocation for OFDMA | | | |
|---|---|---|---|---|---|---|
|  |  |  | 20 MHz | 40 MHz | 80 MHz | 160 MHz |
| OFDM | 1 | N/A | 20 | 40 | 80 | 160 |
| OFDMA | 2 | 0 | (10, 10) | (20, 20) | (40, 40) | (80, 80) |
|  | 3 | 1 | (10, 5, 5) | (20, 10, 10) | (40, 20, 20) | (80, 40, 40) |
|  |  | 2 | (5, 10, 5) | (10, 20, 10) | (20, 40, 20) | (40, 80, 40) |
|  |  | 3 | (5, 5, 10) | (10, 10, 20) | (20, 20, 40) | (40, 40, 80) |
|  | 4 | 4 | (10, 5, 2.5, 2.5) | (20, 10, 5, 5) | (40, 20, 10, 10) | (80, 40, 20, 20) |
|  |  | 5 | (10, 2.5, 5, 2.5) | (20, 5, 10, 5) | (40, 10, 20, 10) | (80, 20, 40, 20) |
|  |  | 6 | (10, 2.5, 2.5, 5) | (20, 5, 5, 10) | (40, 10, 10, 20) | (80, 20, 20, 40) |
|  |  | 7 | (5, 10, 2.5, 2.5) | (10, 20, 5, 5) | (20, 40, 10, 10) | (40, 80, 20, 20) |
|  |  | 8 | (2.5, 10, 5, 2.5) | (5, 20, 10, 5) | (10, 40, 20, 10) | (20, 80, 40, 20) |
|  |  | 9 | (2.5, 10, 2.5, 5) | (5, 20, 5, 10) | (10, 40, 10, 20) | (20, 80, 20, 40) |
|  |  | 10 | (5, 2.5, 10, 2.5) | (10, 5, 20, 5) | (20, 10, 40, 10) | (40, 20, 80, 20) |
|  |  | 11 | (2.5, 5, 10, 2.5) | (5, 10, 20, 5) | (10, 20, 40, 10) | (20, 40, 80, 20) |
|  |  | 12 | (2.5, 2.5, 10, 5) | (5, 5, 20, 10) | (10, 10, 40, 20) | (20, 20, 80, 40) |
|  |  | 13 | (5, 2.5, 2.5, 10) | (10, 5, 5, 20) | (20, 10, 10, 40) | (40, 20, 20, 80) |
|  |  | 14 | (2.5, 5, 2.5, 10) | (5, 10, 5, 20) | (10, 20, 10, 40) | (20, 40, 20, 80) |
|  |  | 15 | (2.5, 2.5, 5, 10) | (5, 5, 10, 20) | (10, 10, 20, 40) | (20, 20, 40, 80) |
|  |  | 16 | (5, 5, 5, 5) | (10, 10, 10, 10) | (20, 20, 20, 20) | (40, 40, 40, 40) |

In Table 1, (a,b) represents a case that bandwidths with a and b are allocated to two subchannel respectively, (a,b,c) represents a case that bandwidths with a, b, and c are allocated to three subchannel respectively, and (a,b,c,d) represents a case that bandwidths with a, b, c, and are allocated to four subchannel respectively.

Referring to Table 1, when a 20 MHz bandwidth is allocated to two users, the 20 MHz bandwidth may be divided into two 10 MHz subchannels. When the 20 MHz bandwidth is allocated to three users, the 20 MHz bandwidth may be divided into 10 MHz, 5 MHz, and 5 MHz subchannels; 5 MHz, 10 MHz, and 5 MHz subchannels; or 5 MHz, 5 MHz, and 10 MHz subchannels. When the 20 MHz bandwidth is allocated to four users, the 20 MHz bandwidth may be divided into 10 MHz, 5 MHz, 2.5 MHz, and 2.5 MHz subchannels; 10 MHz, 2.5 MHz, 5 MHz, and 2.5 MHz subchannels; 10 MHz, 2.5 MHz, 2.5 MHz, and 5 MHz subchannels; 5 MHz, 10 MHz, 2.5 MHz, and 2.5 MHz subchannels; 2.5 MHz, 10 MHz, 5 MHz, and 2.5 MHz subchannels; 2.5 MHz, 10 MHz, 2.5 MHz, and 5 MHz subchannels; 5 MHz, 2.5 MHz, 10 MHz, and 2.5 MHz subchannels; 2.5 MHz, 5 MHz, 10 MHz, and 2.5 MHz subchannels; 2.5 MHz, 2.5 MHz, 10 MHz, and 5 MHz subchannels; 5 MHz, 2.5 MHz, 2.5 MHz, and 10 MHz subchannels; 2.5 MHz, 5 MHz, 2.5 MHz, and 10 MHz subchannel; 2.5 MHz, 2.5 MHz, 5 MHz, and 10 MHz subchannels; or 5 MHz, 5 MHz, 5 MHz, and 5 MHz.

As shown in Table 1, a 40 MHz bandwidth, an 80 MHz bandwidth, and a 160 MHz bandwidth may be divided in the same way.

In one embodiment, since seventeen subchannel division schemes are provided for each bandwidth in an example shown in Table 1, the subchannel allocation information may have five bits in order to differentiate the subchannel division schemes. The seventeen subchannel division schemes may correspond to values of 0 to 16 among values of 0 to 31 represented by 5 bits.

In another embodiment, when only one user exists, an orthogonal frequency division multiplexing (OFDM) transmission may be used. Accordingly, the subchannel allocation information may further have one bit for differentiating the OFDM transmission and the OFDMA transmission. That is, the subchannel allocation information may have sixth bits In yet another embodiment, the OFDM transmission may be indicated by any one of values (for example, values of 17 to 31) that do not correspond to the seventeen subchannel division schemes among the values of 0 to 31 represented by the subchannel allocation information with five bits.

It is shown in FIG. 7 that the beamformee devices sequentially transmit the CB frames. However, the beamformee devices may transmit the CB frames in parallel. Such embodiments are described with reference to FIG. 14 to FIG. 17.

Figure 14:
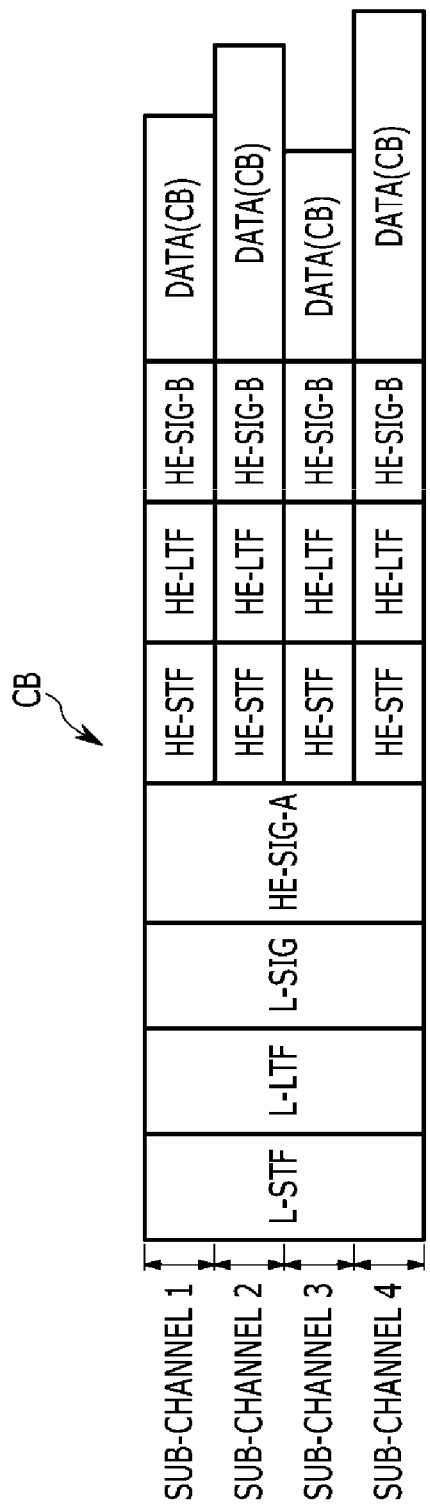
FIG. 14, FIG. 15, FIG. 16, and FIG. 17 each shows a parallel transmission method of a CB frame in a wireless communication network according to various embodiments.
Figure 15:
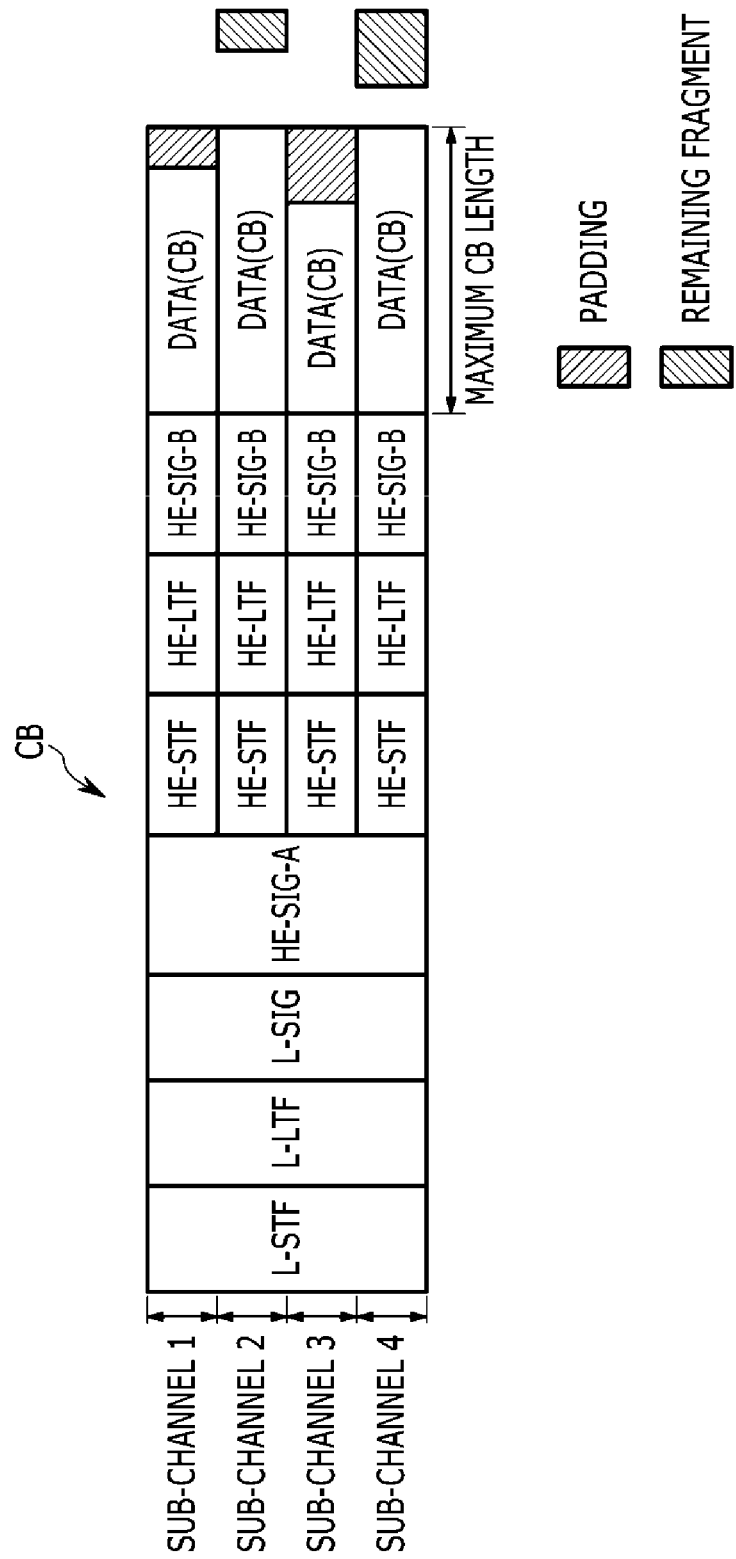
Figure 16:
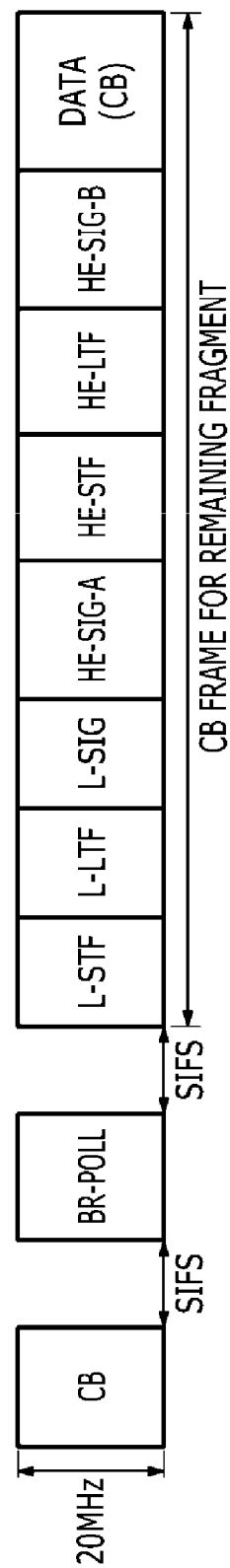
Figure 17:
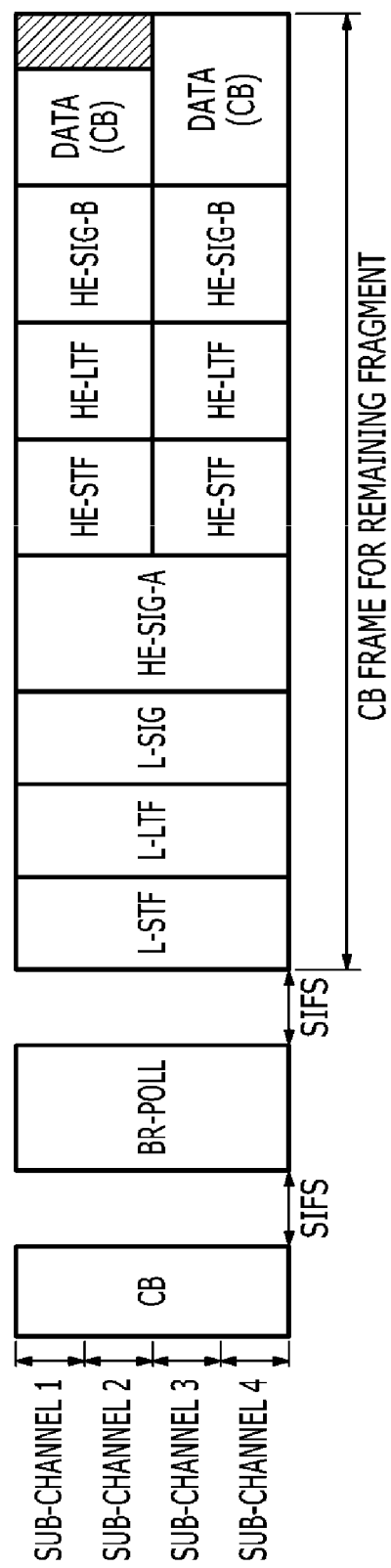

FIG. 14, FIG. 15, FIG. 16, and FIG. 17 each shows a parallel transmission method of a CB frame in a wireless communication network according to various embodiments. FIG. 14 shows an example of transmitting a CB frame in parallel in a wireless communication network according to an embodiment, FIG. 15 shows another example of transmitting a CB frame in parallel in a wireless communication network according to an embodiment, and FIG. 16 and FIG. 17 show examples of transmitting remaining fragments of a CB frame in a wireless communication network according to an embodiment.

Referring to FIG. 14, in an embodiment, a plurality of beamformee devices transmit CB frames in parallel. In some embodiments, the beamformee device may transmit the CB frames in an uplink OFDMA scheme.

The CB frame transmitted by each beamformee device includes beamforming report information of its allocated subchannel at a data field. In some embodiments, each beamformee device may transmit the CB frame on its allocated subchannel. For example, beamformee device 1 may transmit the CB frame on subchannel 1, beamformee device 2 may transmit the CB frame on subchannel 2, beamformee device 3 may transmit the CB frame on subchannel 3, and beamformee device 4 may transmit the CB frame on subchannel 4.

In some embodiments, the CB frame may have a HE frame format. In one embodiment, each beamformee device may transmit a legacy compatible part of the CB frame on entire subchannels and may transmit a HE compatible part on its allocated subchannel.

The legacy compatible part includes a legacy short training field (L-STF), a legacy long training field (L-LTF), a legacy signal field (L-SIG), and an HE signal field (HE-SIG-A). The HE compatible part includes a HE preamble and a data field, and may further include an additional HE signal field (HE-SIG-B). The HE preamble may include a HE short training field (HE-STF) and a HE long training field (HE-LTF).

As such, the beamformee devices transmit the CB frames in parallel, thereby reducing a time necessary for transmitting the CB frames compared with a case that the CB frames are sequentially transmitted. Further, since each beamformee device can transmit the beamforming report information of its allocated subchannel, the overhead of the CB frame can be reduced.

As shown in FIG. 14, lengths of the CB frames (i.e., lengths of data fields in the CB frames) transmitted by the beamformee devices may be different from each other. When receiving the CB frames having different lengths in parallel, the beamformer device may not decode the received CB frames. Because the length of the data field in the CB frame is determined by each beamformee device, each beamformee device cannot know the length of the data field to be transmitted by the other beamformee device such that padding for adjusting the length of the data field cannot be performed.

Referring to FIG. 15, in another embodiment, each beamformee device may transmit a CB frame by adjusting a length of the CB frame to a maximum CB length. Therefore, when the length of data to be transmitted through the data field of the CB frame is shorter than the maximum CB length, the beamformee device may perform the padding for adding pad bits to remaining portion of the data field. When the length of data to be transmitted through the data field of the CB frame is longer than the maximum CB length, the beamformee device may partition the beamforming report information into two or more fragments and transmit two or more CB frames.

In some embodiments, the beamformer device may partition a MAC service data unit (MSDU) or a MAC management protocol data unit (MMPDU) including the beamforming report information into two or more smaller MAC protocol data units (MPDUs). The beamformer device may transmit the two or more CB frames that include the two or more MPDUs respectively.

In some embodiments, the beamformer device may indicate the maximum CB length to the beamformee devices. The maximum CB length may be a maximum length of the data field in the CB frame or a maximum length of the CB frame.

In one embodiment, the beamformer device may indicate the maximum CB length using the NDPA frame. For example, a data field of the NDPA frame, i.e., a frame body field of a MAC frame inserted to the NDPA frame may include information on the maximum CB length.

In another embodiment, the beamformer device may indicate the maximum CB length using the NDP frame. For example, a HE signal field (HE-SIG-A or HE-SIG-B) of the NDP frame may include the maximum CB length as the signaling information.

As such, when the beamformer device indicates the maximum CB length using the NDPA frame or the NDP frame, the beamformer device and the beamformee devices may change the maximum CB length each time performing a sounding procedure.

On the other hand, the MAC efficiency may be deteriorated because the beamformee device may perform unnecessary padding or fragmentation due to the maximum CB length. Accordingly, in yet another embodiment, the beamformer device may select the maximum CB length based on other information. For example, the beamformer device may determine the maximum CB length based on a previous CB frame length or the number of antennas.

Referring to FIG. 16, in some embodiments, when beamforming report information is partitioned, a beamformer device may receive the first CB frames from a plurality of beamformee devices and then transmit a BR-poll frame to a beamformee device having a remaining fragment to allow the beamformee device to transmit the remaining fragment. The beamformer device receiving the BR-poll frame transmits a next CB frame including the remaining fragment to the beamformer device.

In some embodiments, a MAC header of the CB frame may indicate whether the remaining fragment exists. In one embodiment, a more fragments field of the MAC header may indicate whether the remaining fragment exists. Therefore, the beamformer device can determine which beamformee device has the remaining fragment based on the MAC header of the received CB frame.

In some embodiments, when a plurality of beamformee devices have the remaining fragment, the beamformee devices may transmit CB frames including the remaining fragment in parallel. In one embodiment, when the beamformee devices transmit the next CB frames in parallel, each beamformee device may transmit the next CB frame on its allocated subchannel.

In another embodiment, the feedback of the CB frame may terminate in a part of a plurality of beamformee devices joining in beamforming. In this case, when the next CB frames are transmitted, remaining beamformee devices may use subchannels different from subchannels used for transmitting the first CB frames. For example, as shown in FIG. 17, the feedback of the CB frame may terminate in beamformee device 1 and beamformee device 2, and beamformee device 3 and beamformee device 4 may have remaining fragments. Then, beamformee device 3 may transmit the CB frame through subchannels 1 and 2, and beamformee device 4 may transmit the CB frame through subchannels 3 and 4. The beamformer device may include changed subchannel allocation information to the BR-poll frame. Since the maximum CB length may be changed when the subchannel allocation is changed, the BR-poll frame may further include information on the maximum CB length.

In some embodiments, the BR-poll frame may include information on the fragment that has not been successfully received. Accordingly, the beamformee device may retransmit a CB frame including the fragment which the beamformer device has not successfully received.

Hereinafter, embodiments for allocating subchannels in a sounding procedure are described with reference to FIG. 18 to FIG. 24.

FIG. 18, FIG. 19, FIG. 20, FIG. 21, FIG. 22, FIG. 23, and FIG. 24 each shows a subchannel allocation method in a wireless communication network according to various embodiments.

Figure 18:
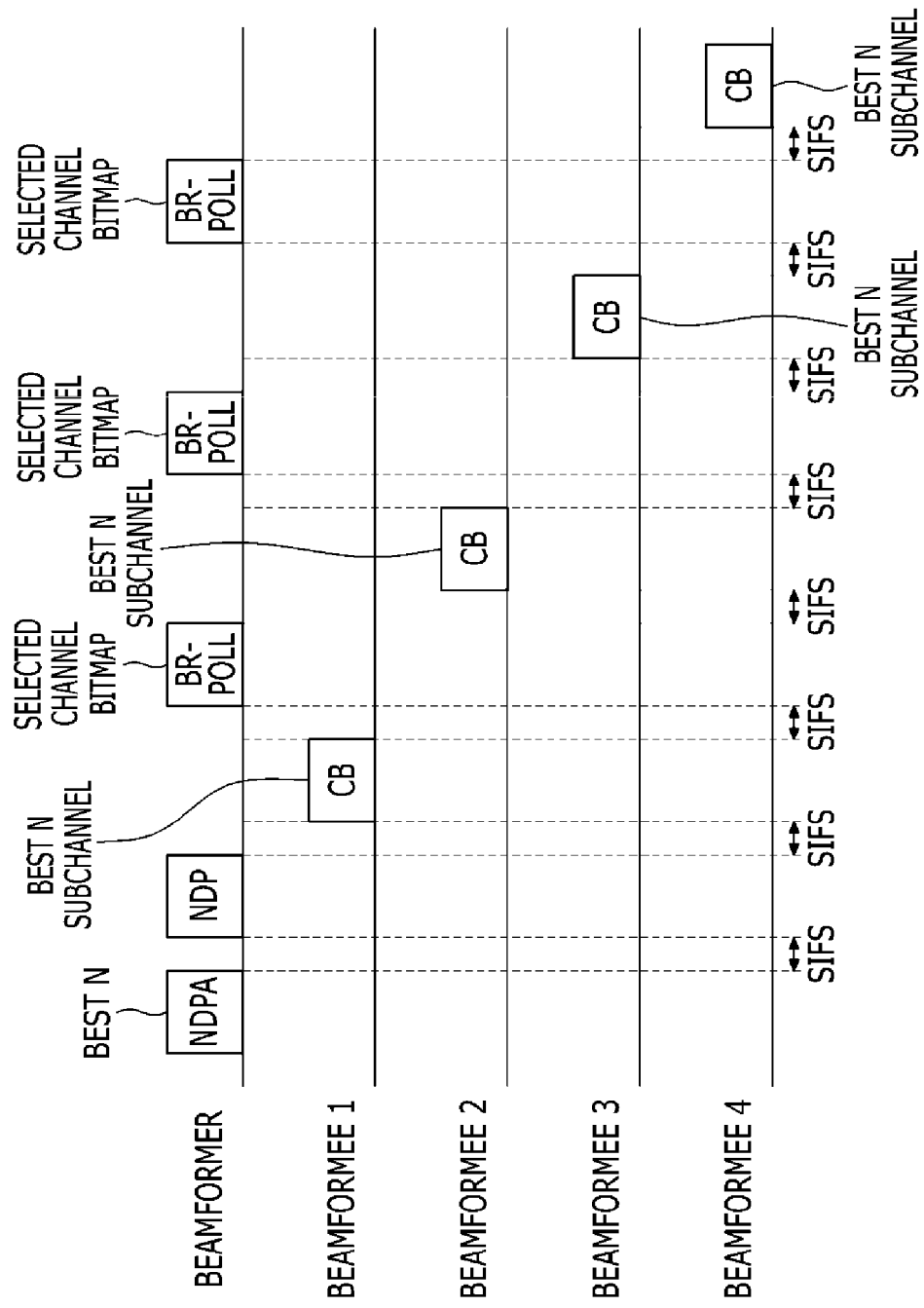
FIG. 18, FIG. 19, FIG. 20, FIG. 21, FIG. 22, FIG. 23, and FIG. 24 each shows a subchannel allocation method in a wireless communication network according to various embodiments.

Referring to FIG. 18, in an embodiment, a beamformer device transmits an NDPA frame to beamformee devices. The NDPA frame includes information on the number of best subchannels to be fed back by the beamformee device through a CB frame. In some embodiments, the NDPA frame may include information requesting to transmit feedback information on the best N subchannels, i.e., information indicating N. Herein, N is an integer greater than or equal to 1, and may be determined by the beamformer device. The beamformer device transmits the NDPA frame and then transmits an NDP frame to the beamformee device after a SIFS interval.

The beamformee devices receiving the NDP frame sequentially transmit CB frames. The CB frame may include the feedback information on the best N subchannels.

In some embodiments, beamformee device 1 among the beamformee devices receiving the NDP frame feeds the CB frame back to the beamformer device as a response of the NDPA frame after the SIFS interval. The CB frame transmitted by beamformee device 1 includes the feedback information on the best N subchannels for beamformee device 1 among a plurality of subchannels.

The beamformer device receiving the CB frame from beamformee device 1 transmits a BR-poll frame to beamformee device 2 after the SIFS interval. In one embodiment, the beamformer device may select a subchannel for beamformee device 1 based on the feedback information on the best N subchannels that is provided by beamformee device 1. The BR-poll frame may include selected subchannel information indicating the selected subchannel for a previous beamformee device, i.e., beamformee device 1. In one embodiment, the selected subchannel information may be transferred by a selected subchannel bitmap field that is represented in the form of bitmap. The selected subchannel bitmap has a plurality of bits that correspond to the plurality of subchannels respectively. When a bit has a predetermined value (for example, '1'), it is indicated that a subchannel corresponding to the bit is selected for the previous beamformee device.

Beamformee device 2 receiving the BR-poll frame selects its best N subchannels from among the plurality of subchannels based on the selected subchannel information and transmits the CB frame including the feedback information on the selected best N subchannels. In one embodiment, beamformee device 2 may select the N subchannels from among subchannels excluding the subchannel selected for the previous beamformee device (i.e., beamformee device 1) based on the selected subchannel information.

The beamformer device receiving the CB frame from beamformee device 2 transmits a BR-poll frame to beamformee device 3 after the SIFS interval. In one embodiment, the beamformer device may select a subchannel for beamformee device 2 based on the feedback information on the best N subchannels that is provided by beamformee device 2. The BR-poll frame may include selected subchannel information indicating the selected subchannel for the previous beamformee devices, i.e., beamformee devices 1 and 2. In one embodiment, the selected subchannel information may be the selected subchannel bitmap where bits corresponding to the subchannels selected for the previous beamformee devices (i.e., beamformee devices 1 and 2) have the predetermined value.

As described above, beamformee device 3 receiving the BR-poll frame selects its best N subchannels from among the plurality of subchannels based on the selected subchannel information and transmits the CB frame including the feedback information on the selected best N subchannels. The beamformer device receiving the CB frame from beamformee device 3 may select a subchannel for beamformee device 3 based on the feedback information on the best N subchannels, and transmits to beamformee device 4 a BR-poll frame including selected subchannel information for the previous beamformee devices. Beamformee device 4 receiving the BR-poll frame selects its best N subchannels based on the selected subchannel information and transmits the CB frame including the feedback information on the selected best N subchannels. The beamformer device receiving the CB frame from beamformee device 4 may select a subchannel for beamformee device 4 based on the feedback information on the best N subchannels.

Accordingly, the beamformer device can allocate the subchannels to the beamformee devices. Further, the beamformer device may provide the beamformee device with subchannel allocation information on the subchannel selected for the beamformee device. In some embodiments, the beamformer device may provide the subchannel allocation information using a HE signal field.

According to the above embodiment, the subchannels can be allocated to the beamformee devices by using the sounding procedure described with reference to FIG. 7.

Figure 19:
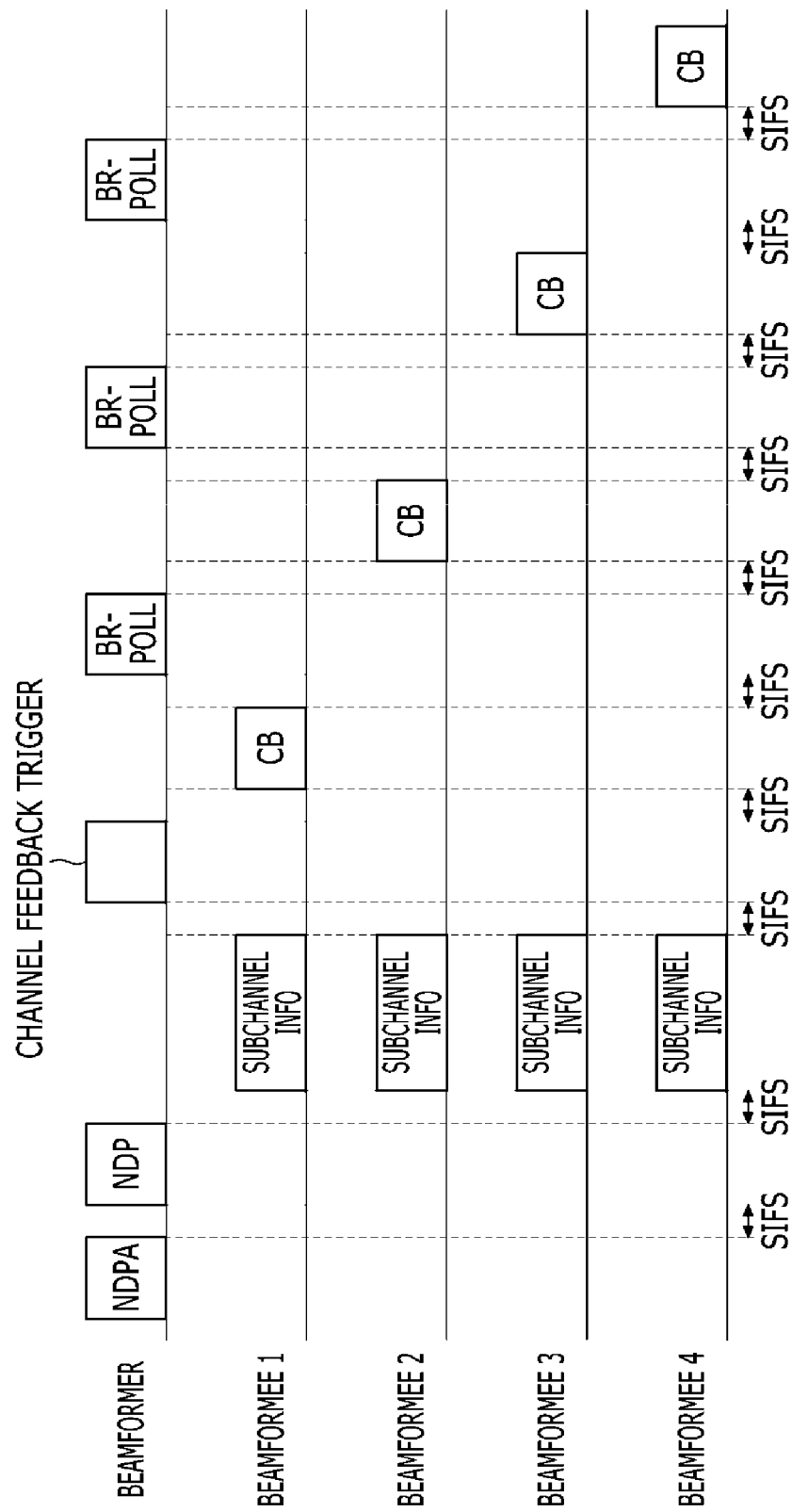

Referring to FIG. 19, in another embodiment, a beamformer device transmits an NDPA frame to beamformee devices and then transmits an NDP frame to the beamformee devices after a SIFS interval.

Each beamformee device measures a plurality of subchannels based on the NDP frame and transmits a subchannel information frame including measured information for each of the plurality of subchannels. In some embodiment, the measured information may include an average SNR of each subchannel. In some embodiments, the beamformee devices may transmit the subchannel information frames in parallel.

The beamformer device receiving the subchannel information frames from the beamformee devices allocates a subchannel to each beamformee device based on the measured information. The beamformer device transmits to the beamformee devices a channel feedback trigger frame including allocation information of the subchannels. In some embodiments, the channel feedback trigger frame may have a frame format that is similar to a frame format of the NDPA frame or the NDP frame. When the channel feedback trigger frame has the similar frame format to the NDPA frame, a frame body field of a MAC frame inserted to a data field of the channel feedback trigger frame may include the subchannel allocation information. When the channel feedback trigger frame has the similar frame format to the NDP frame, a HE signal field (HE-SIG-A or HE-SIG-B) of the channel feedback trigger frame may include the subchannel allocation information.

Beamformee device 1 among the beamformee devices receiving the channel feedback trigger frame transmits a CB frame to the beamformer device as a response of the channel feedback trigger frame after a SIFS interval. The beamformer device receiving the CB frame from beamformee device 1 transmits a BR-poll frame to beamformee device 2. Beamformee device 2 receiving the BR-poll frame feeds a CB frame back to the beamformer device, and the beamformer device receiving the CB frame from beamformee device 2 transmits a BR-poll frame to beamformee device 3. Beamformee device 4 receiving the BR-poll frame feeds a CB frame back to the beamformer device, and the beamformer device receiving the CB frame from beamformee device 3 transmits a BR-poll frame to beamformee device 4. Beamformee device 4 receiving the BR-poll frame feeds a CB frame back to the beamformer device.

In some embodiments, the CB frame transmitted by each beamformee device includes subchannel information of its allocated subchannel as described with reference to FIG. 8 to FIG. 11.

Figure 20:
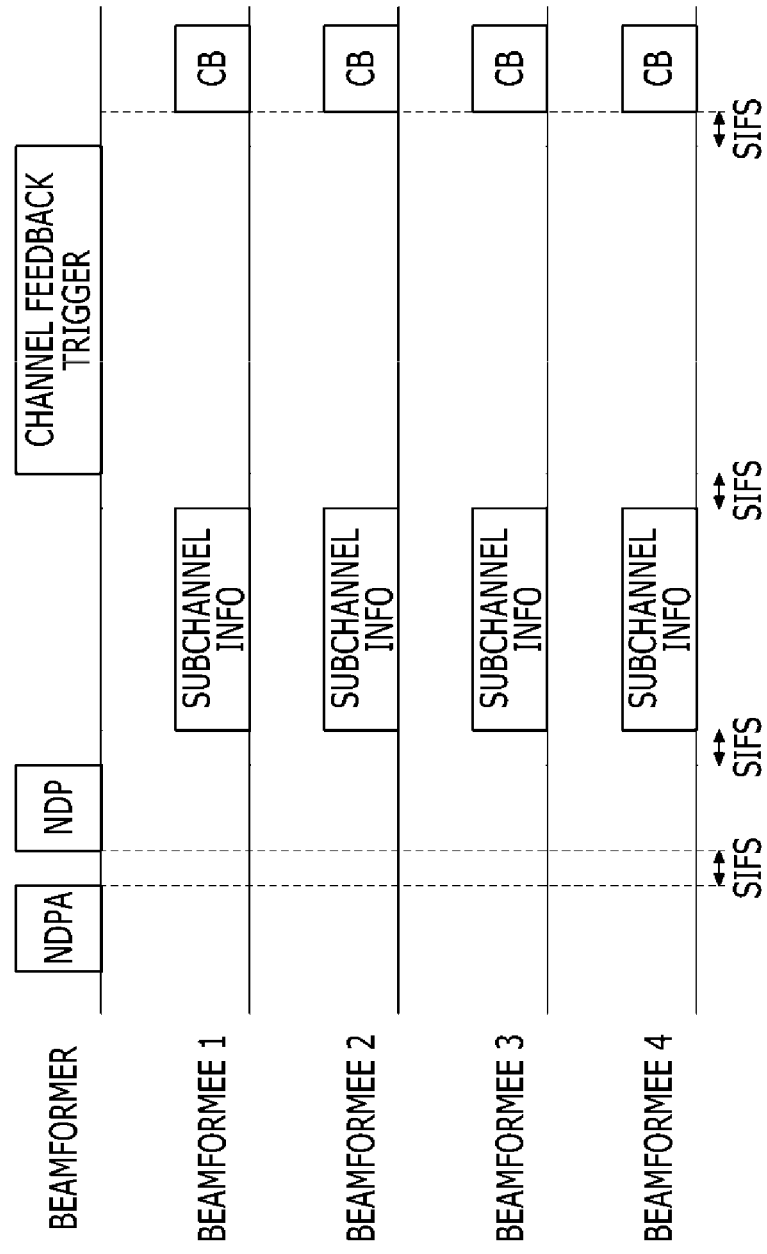

Referring to FIG. 20, in another embodiment, a plurality of beamformee devices transmits CB frames in parallel after receiving a channel feedback trigger frame. In some embodiments, the beamformee devices may transmit the CB frames using an uplink OFDMA scheme.

Since each beamformee device can identify its allocated subchannel using the channel feedback trigger frame, it can transmit the CB frame through the allocated subchannel. For example, beamformee device 1 may transmit the CB frame on subchannel 1, beamformee device 2 may transmit the CB frame on subchannel 2, beamformee device 3 may transmit the CB frame on subchannel 3, and beamformee device 4 may transmit the CB frame on subchannel 4.

Figure 21:
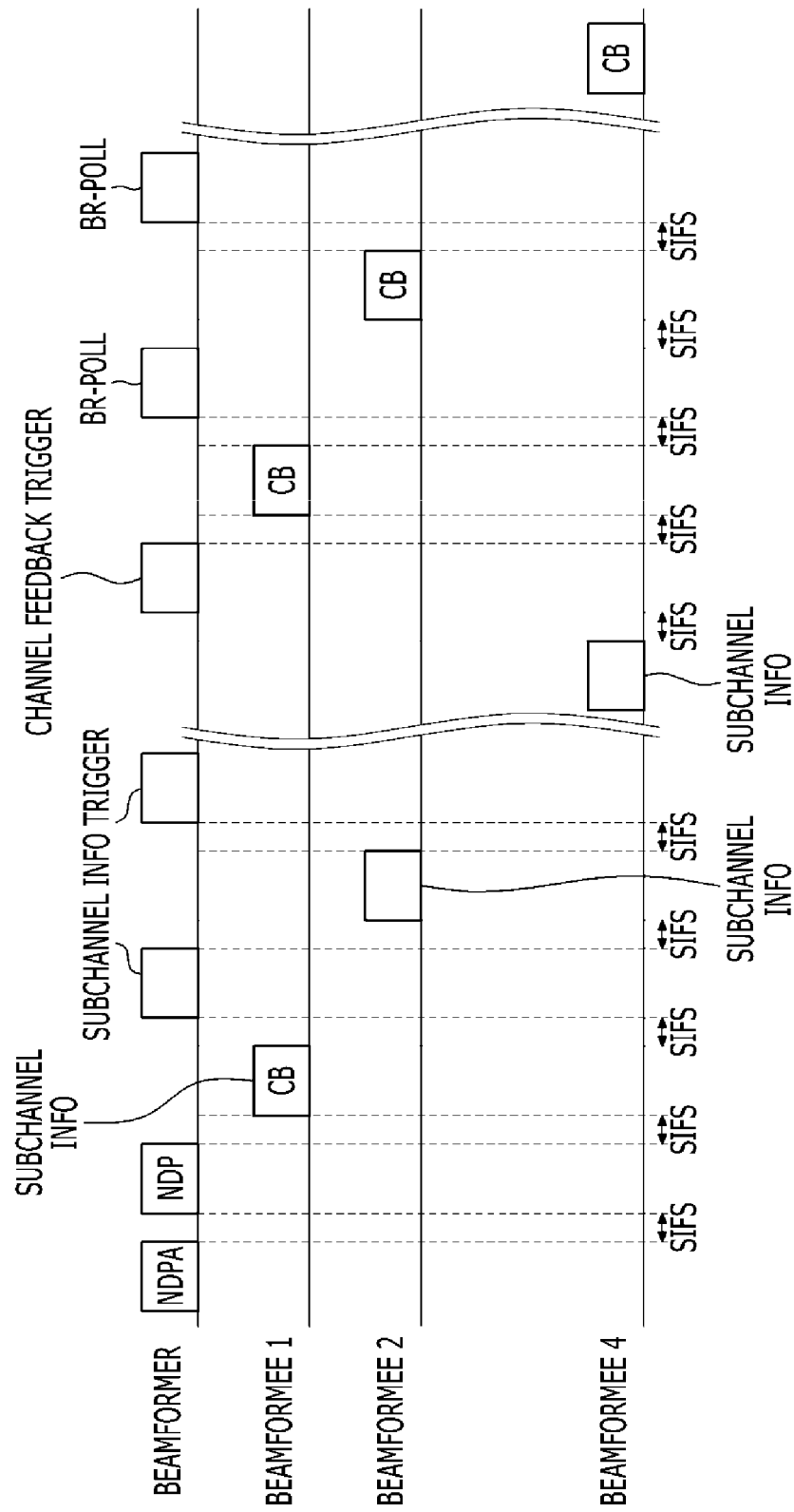
Figure 22:
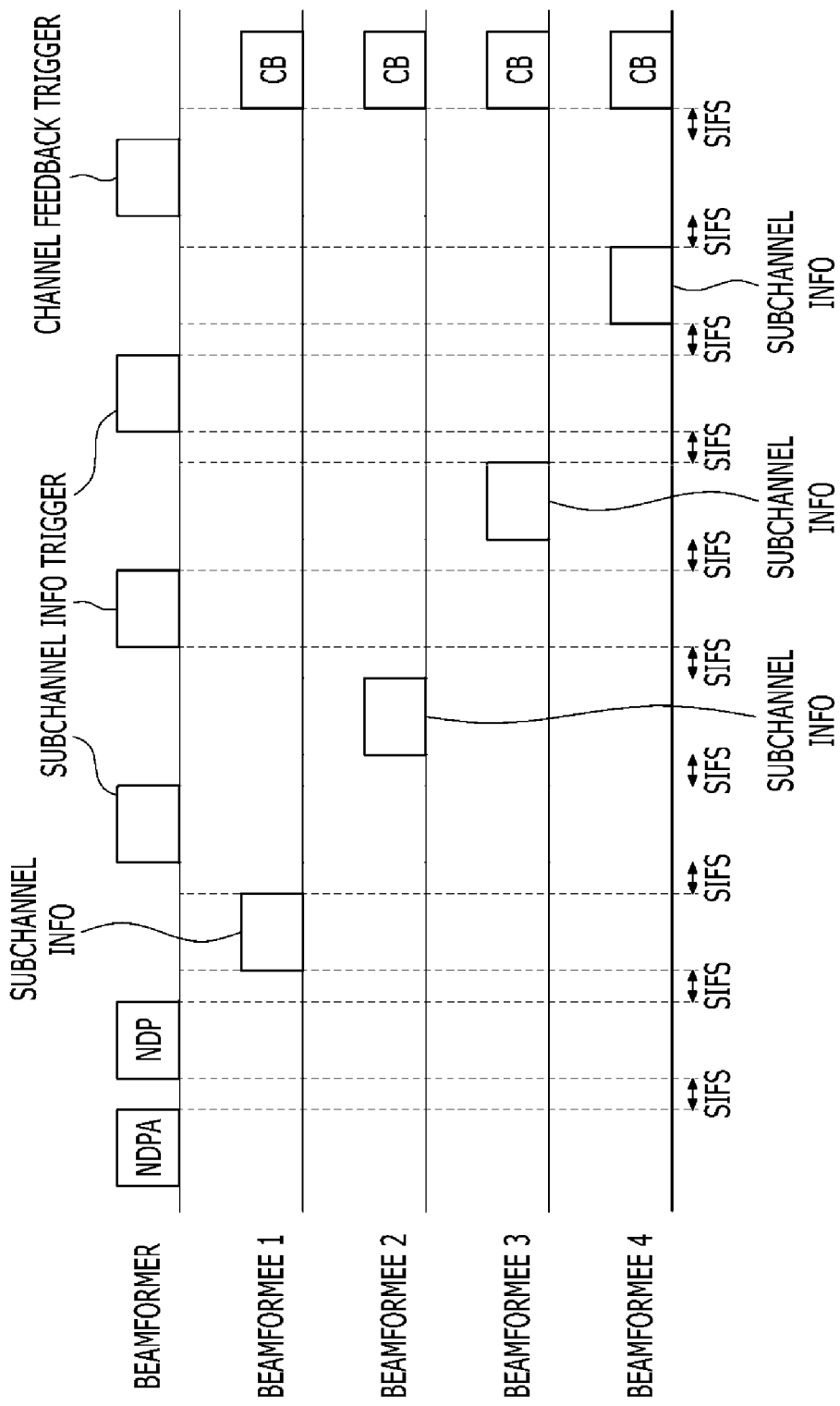

Referring to FIG. 21 and FIG. 22, in yet another embodiment, a plurality of beamformee devices sequentially transmits subchannel information frames.

Each beamformee device measure subchannel information of a plurality of subchannels based on an NDP frame, and beamformee device 1 first transmits the subchannel information frame including the measured information to a beamformer device. The beamformer device receiving the subchannel information frame from beamformee device 1 transmits a subchannel information trigger frame to beamformee device 2. The beamformee device 2 receiving the subchannel information trigger frame feeds the subchannel information frame including the measured information back to the beamformer device, and the beamformer device receiving the subchannel information frame from beamformee device 2 transmits a subchannel information trigger frame to beamformee device 3. The beamformee device 3 receiving the subchannel information trigger frame feeds the subchannel information frame including the measured information back to the beamformer device, and the beamformer device receiving the subchannel information frame from beamformee device 3 transmits a subchannel information trigger frame to beamformee device 4. The beamformee device 4 receiving the subchannel information trigger frame feeds the subchannel information frame including the measured information back to the beamformer device.

Accordingly, the beamformer device can receive the measured information of the subchannels from the beamformee devices, allocate the subchannels to the beamformee devices based on the measured information, and provide the beamformee devices with a channel feedback trigger frame including the subchannel allocation information.

In one embodiment, the beamformee devices receiving the channel feedback trigger frame may sequentially transmit CB frames as shown in FIG. 21.

In another embodiment, the beamformee devices receiving the channel feedback trigger frame may transmit CB frames in parallel as shown in FIG. 22.

According to the above embodiments, after a subchannel allocation procedure is performed, the feedback on the allocated subchannel can be provided. Therefore, the sounding procedure can be divided into the subchannel allocation procedure and the channel feedback procedure.

Figure 23:
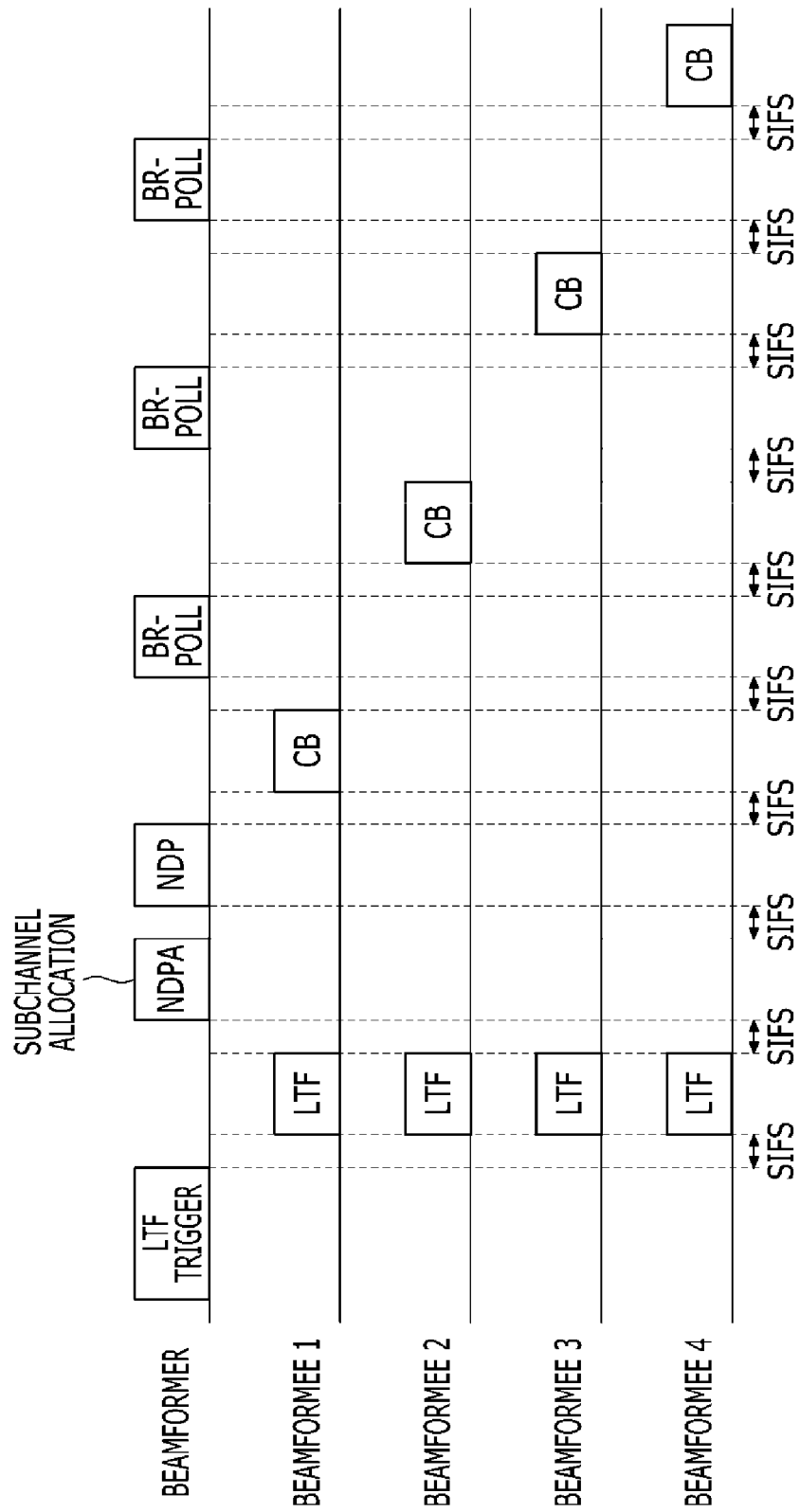

Referring to FIG. 23, in some embodiments, a beamformer device may directly measure subchannels and allocate the subchannels.

The beamformer device transmits a trigger frame to a plurality of beamformee devices, and the beamformee devices transmit channel measurement frames to the beamformer device in parallel.

The beamformer device measures subchannels for each beamformee device based on the channel measurement frame and allocates the subchannels to the beamformee devices based on the measured information of the subchannels. In some embodiments, the beamformer device may measure an average SNR of each of the subchannels for each beamformee device and allocated the subchannels based on the average SNRs.

Subsequently, the beamformer device performs a sounding procedure in a similar way to the above embodiments. For example, as described with reference to FIG. 7, the beamformer device transmits an NDPA frame and an NDP frame to the beamformee devices, and the beamformee devices sequentially feed CB frames back to the beamformer device. In one embodiment, as shown in FIG. 23, the NDPA frame may include the subchannel allocation information. In another embodiment, a HE signal field (HE-SIG-A or HE-SIG-B) of the NDP frame may include the subchannel allocation information.

Figure 24:
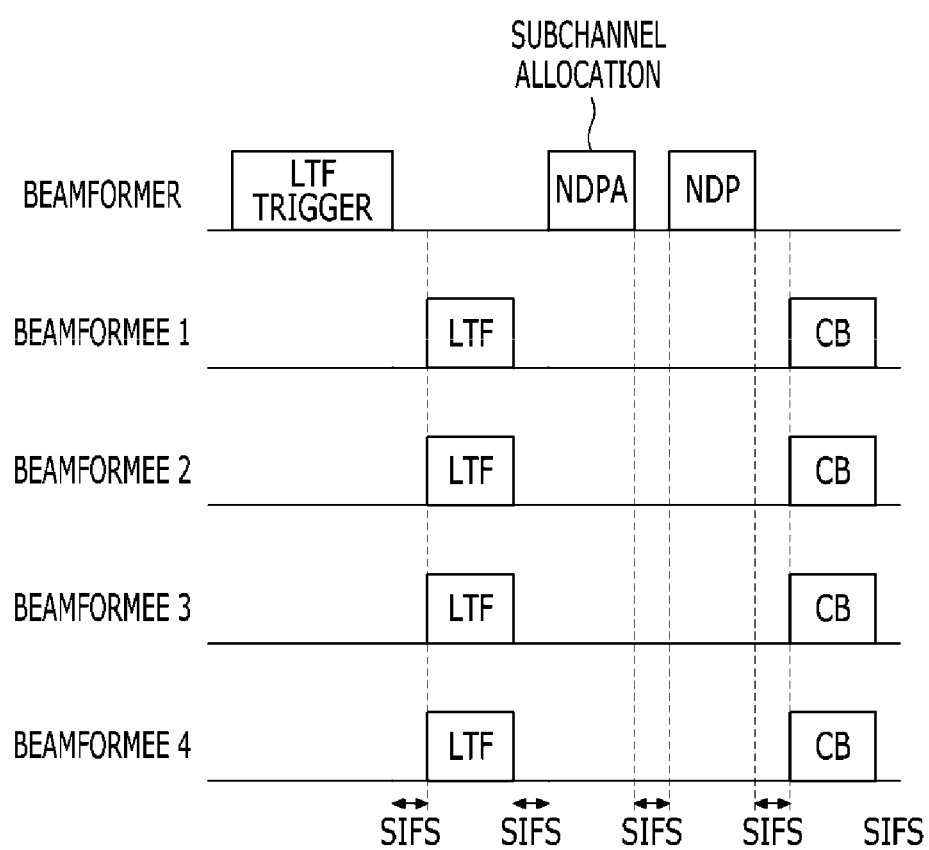

Referring to FIG. 24, in another embodiment, a plurality of beamformee devices may transmit CB frames in parallel.

In some embodiments, since a long training field (LTF) can be used for channel estimation, the channel measurement frame transmitted by the beamformee device may be an LTF frame including the LTF. In this case, the beamformee devices may transmit the LTF frames in a code division multiple access (CDMA) scheme in order to differentiate the LTF frames transmitted by the beamformee devices. That is, the beamformee devices may be differentiated by applying predetermined identification codes (for example, Hadamard orthogonal codes) to the LTFs. The trigger frame transmitted by the beamformer device may include information on the LTFs to be used by the beamformee devices. In one embodiment, the information of the LTFs may include information indicating the number of beamformee devices (i.e., users) for transmitting the LTF frames and a code (i.e., the identification code) to be used by each beamformee device.

FIG. 25, FIG. 26, and FIG. 27 each shows an LTF frame in a wireless communication network according to various embodiments.

Referring to FIG. 25, FIG. 26, and FIG. 27, an LTF frame includes a legacy compatible part and a HE compatible part. The legacy compatible part includes a legacy short training field (L-STF), a legacy long training field (L-LTF), a legacy signal field (L-SIG), and an HE signal field (HE-SIG-A). The beamformee devices transmit common information through the legacy compatible part.

The HE compatible part includes a plurality of HE LTFs to be used for subchannel measurement. The HE compatible part may further include a HE short training field (HE-STF) to used for automatic gain control of the HE compatible part. The HE compatible part may further include an additional HE signal field (HE-SIG-B).

As shown in FIG. 25, when two beamformee devices transmit LTF frames, the beamformer device may provide information on two identification codes. The LTF frame may include two HE-LTFs (HE-LTF1 and HE-LTF2). For example, a code matrix defined in Equation 1 may be used. An identification code [1 −1] corresponding to the first row of the code matrix may be allocated to beamformee device 1, and an identification code [1 1] corresponding to the second row of the code matrix may be allocated to beamformee device 2. Then, beamformee device 1 may transmit the LTF frame by multiplying the HE-LTF by 1 and multiplying HE-LTF2 by −1, and beamformee device 2 may transmit the LTF frame by multiplying the HE-LTF1 by 1 and multiplying the HE-LTF2 by 1. The trigger frame may include information on the code matrix and information on a row to be used by each beamformee device. Alternatively, when the code matrix is predefined between the beamformer device and the beamformee devices, the trigger frame may include the number of beamformee devices and information on a row to be used by each beamformee device.

$$\begin{bmatrix} 1 & -1 \\ 1 & 1 \end{bmatrix} \quad \text{Equation 1}$$

As shown in FIG. 26, when three beamformee devices transmit LTF frames, the beamformer device may provide information on three identification codes. The LTF frame may include three HE-LTFs (HE-LTF1, HE-LTF2, and HE-LTF3). For example, a code matrix defined in Equation 2 may be used. An identification code [1 −1 1] corresponding to the first row of the code matrix may be allocated to beamformee device 1, an identification code [1 −$w^1$ $w^2$] corresponding to the second row of the code matrix may be allocated to beamformee device 2, and an identification code [1 −$w^2$ $w^4$] corresponding to the second row of the code matrix may be allocated to beamformee device 3. Then, beamformee device 1 may transmit the LTF frame by multiplying the HE-LTF by 1, multiplying HE-LTF2 by −1, and multiplying HE-LTF3 by 1. Beamformee device 2 may transmit the LTF frame by multiplying the HE-LTF1 by 1, multiplying the HE-LTF2 by −$w^1$, and multiplying the HE-LTF3 by $w^2$. Beamformee device 3 may transmit the LTF frame by multiplying the HE-LTF1 by 1, multiplying the HE-LTF2 by −$w^2$, and multiplying the HE-LTF3 by $w^4$.

$$\begin{bmatrix} 1 & -1 & 1 \\ 1 & -w^1 & w^2 \\ 1 & -w^2 & w^4 \end{bmatrix}, \quad \text{Equation 2}$$

$$w = \exp\left(-\frac{j2\pi}{3}\right)$$

As shown in FIG. 26, when four beamformee devices transmit LTF frames, the beamformer device may provide information on four identification codes. The LTF frame may include four HE-LTFs (HE-LTF1, HE-LTF2, HE-LTF3, and HE-LTF4). For example, a code matrix defined in Equation 3 may be used. An identification code [1 −1 1 1] corresponding to the first row of the code matrix may be allocated to beamformee device 1, an identification code [1 1 −1 1] corresponding to the second row of the code matrix may be allocated to beamformee device 2, an identification code [1 1 1 −1] corresponding to the second row of the code matrix may be allocated to beamformee device 4, and an identification code [−1 1 1 1] corresponding to the second row of the code matrix may be allocated to beamformee device 4. Then, beamformee device 1 may transmit the LTF frame by multiplying the HE-LTF1 by 1, multiplying the HE-LTF2 by −1, multiplying the HE-LTF3 by 1, and multiplying the HE-LTF4 by 1. Beamformee device 2 may transmit the LTF frame by multiplying the HE-LTF1 by 1, multiplying the HE-LTF2 by 1, multiplying the HE-LTF3 by −1, and multiplying the HE-LTF4 by 1. Beamformee device 3 may transmit the LTF frame by multiplying the HE-LTF1 by 1, multiplying the HE-LTF2 by 1, multiplying the HE-LTF3 by 1, multiplying the HE-LTF4 by −1. Beamformee device 4 may transmit the LTF frame by multiplying the HE-LTF1 by −1, multiplying the HE-LTF2 by 1, multiplying the HE-LTF3 by 1, and multiplying the HE-LTF4 by 1.

$$\begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad \text{Equation 3}$$

In one embodiment, when the LTF frame includes the additional HE signal field (HE-SIG-B), the beamformee devices may transmit common information by multiplying the HE-SIG-Bs by the same sequence. In another embodiment, the beamformee devices may transmit different information by multiplying the HE-SIG-Bs by different sequences. The sequence for HE-SIG-B may be the same as the identification code for the HE-LTFs.

While a 20 MHz bandwidth has been used for description in FIG. 25, FIG. 26, and FIG. 27, the same code matrix may be used in the different bandwidth such that each beamformee device may use a corresponding identification code of the code matrix.

As such, when the beamformee devices transmit the LTF frames using the different identification codes, the beamformer device may despread the received HE-LTFs and then measure an average SNR per subchannel for each beamformee device.

A sounding method according to above embodiments may be executed by a baseband processor 10 shown in FIG. 1 to FIG. 3. In one embodiment, instructions for executing the frame transmitting method and the frame receiving method according to above embodiments may be stored in a non-transitory computer-readable recording medium such as a memory 40. In another embodiment, at least some of the instructions may be MAC software. In yet another embodiment, at least some of the instructions may be transmitted from a non-transitory computer-readable recording medium of a certain server and may be stored in the memory 40.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Further, two or more embodiments may be combined.

What is claimed is:

1. A sounding method by a first receiving device, the method comprising:
   receiving a null data packet announcement (NDPA) frame from a transmitting device;
   receiving a null data packet (NDP) frame from the transmitting device after receiving the NPDA frame; and
   transmitting to the transmitting device a feedback frame including subchannel information measured on a first subchannel after receiving the NDP frame, the first subchannel being a subchannel that is allocated to the first receiving device among a plurality of subchannels into which a predetermined band is divided,
   wherein transmitting the feedback frame includes:
      transmitting the feedback frame to the transmitting device while a second feedback frame including subchannel information measured on the second subchannel is transmitted to the transmitting device by a second receiving device, the second subchannel being a subchannel that is allocated to the second receiving device among the plurality of subchannels.

2. The method of claim 1, wherein the subchannel information includes an average signal-to-noise ratio (SNR) of the first subchannel.

3. The method of claim 1, wherein the subchannel information includes average signal-to-noise ratios (SNRs) of the first subchannel for a plurality of space-time streams.

4. The method of claim 1, wherein the feedback frame further includes subchannel information measured on other subchannels excluding the first subchannel.

5. The method of claim 1, wherein transmitting the feedback frame includes
   adding pad bits to a data field of the feedback frame when a length of data to be transmitted by the feedback frame is shorter than a predetermined length, or partitioning the data into a plurality of fragments and inserting any one of the fragments to the data field of the feedback frame when the length of the data is longer than the predetermined length.

6. The method of claim 5, wherein the NDPA frame indicates information corresponding to the predetermined length.

7. The method of claim 1, wherein the NDPA frame includes allocation information of the first subchannel.

8. The method of claim 1, wherein the subchannel information is measured on each of a predetermined number of subchannels including the first subchannel, and
wherein the first subchannel is allocated based on the subchannel information.

9. The method of claim 8, wherein the NDPA frame includes information on the predetermined number.

10. The method of claim 8, further comprising receiving a frame including selected subchannel information from the transmitting device, the selected subchannel information indicating a subchannel that is selected by other receiving device among the plurality of subchannels,
wherein the predetermined number of subchannels do not include the subchannel that that is selected by the other receiving device.

11. The method of claim 10, wherein the selected subchannel information is represented by a bitmap having a plurality of bits that correspond to the plurality of subchannels respectively, and
wherein a predetermined value in each of the plurality of bits indicates that a corresponding subchannel is selected by the other receiving device.

12. The method of claim 1, wherein transmitting the feedback frame includes:
transmitting a subchannel information frame to the transmitting device after receiving the NDP frame, the subchannel information frame including measurement information that is measured on each of the plurality of subchannels by the first receiving device;
receiving from the transmitting device a channel feedback trigger frame including allocation information of the plurality of subchannels; and
transmitting the feedback frame to the transmitting device after receiving the channel feedback trigger frame.

13. The method of claim 12, wherein transmitting the subchannel information frame includes
transmitting the subchannel information frame to the transmitting device before a second subchannel information frame is transmitted to the transmitting device by the second receiving device or after the second subchannel information frame is transmitted to the transmitting device by the second receiving device, the second subchannel information frame including measurement information that is measured on each of the plurality of subchannels by the second receiving device.

14. The method of claim 12, wherein transmitting the subchannel information frame includes
transmitting the subchannel information frame to the transmitting device while a second subchannel information frame is transmitted to the transmitting device by the second receiving device, the second subchannel information frame including measurement information that is measured on each of the plurality of subchannels by the second receiving device.

15. The method of claim 1, further comprising:
receiving a trigger frame from a transmitting device; and
transmitting a frame including a plurality of long training fields to the transmitting device after receiving the trigger frame,
wherein the plurality of long training fields are multiplied by a predetermined identification code allocated to the first receiving device among a plurality of receiving devices.

16. The method of claim 15, wherein a number of the plurality of long training fields is equal to a number of the plurality of receiving devices.

17. The method of claim 15, wherein the trigger frame includes information on a predetermined identification code allocated to each of the plurality of receiving devices.

18. A sounding method by a transmitting device, the method comprising:
transmitting a null data packet announcement (NDPA) frame to a plurality of receiving devices;
transmitting a null data packet (NDP) frame to the plurality of receiving devices after transmitting the NPDA frame; and
receiving from each receiving device a feedback frame including subchannel information measured on a subchannel that is allocated to each receiving device among a plurality of subchannels into which a band is divided, after transmitting the NDP frame,
wherein the plurality of feedback frames from the plurality of receiving devices are received at a same time, and the NDPA frame includes allocation information of the plurality of subchannels.

* * * * *